US008995269B2

(12) United States Patent
Sato

(10) Patent No.: US 8,995,269 B2
(45) Date of Patent: Mar. 31, 2015

(54) COMPUTER READABLE STORAGE MEDIUM STORING CONGESTION CONTROL PROGRAM, INFORMATION PROCESSING APPARATUS, AND CONGESTION CONTROL METHOD

(75) Inventor: Masahiro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 13/274,420

(22) Filed: Oct. 17, 2011

(65) Prior Publication Data

US 2012/0147748 A1 Jun. 14, 2012

(30) Foreign Application Priority Data

Dec. 10, 2010 (JP) ................................. 2010-276363

(51) Int. Cl.
*H04J 1/16* (2006.01)
*H04L 12/801* (2013.01)
*H04L 12/851* (2013.01)
*H04L 12/835* (2013.01)

(52) U.S. Cl.
CPC ............. *H04L 47/12* (2013.01); *H04L 47/2408* (2013.01); *H04L 47/30* (2013.01)
USPC ......................................................... 370/235

(58) Field of Classification Search
None
See application file for complete search history.

(56) References Cited

U.S. PATENT DOCUMENTS 6,717,912 B1 * 4/2004 Lemyre et al. ................ 370/230
6,940,815 B2    9/2005 Usukura
8,264,957 B1 * 9/2012 Charny et al. ................ 370/230
2007/0081454 A1 * 4/2007 Bergamasco et al. ......... 370/229
2010/0142437 A1 * 6/2010 Gin et al. ...................... 370/316

FOREIGN PATENT DOCUMENTS

| JP | 63-102527 A | 5/1988 |
| JP | 5-75641 A | 3/1993 |
| JP | 5-227210 A | 9/1993 |
| JP | 2001-177575 A | 6/2001 |
| JP | 2006-279784 A | 10/2006 |

OTHER PUBLICATIONS

Japanese Office Action mailed Jun. 24, 2014 for corresponding Japanese Patent Application 2010-276363, with Partial English Translation, 6 pages.

* cited by examiner

*Primary Examiner* — Dang Ton
*Assistant Examiner* — Ronald h Davis
(74) *Attorney, Agent, or Firm* — Fijitsu Patent Center

(57) ABSTRACT

A server stores data to be transmitted in a first S queue, reads the data stored in the first S queue, and transmits it. If congestion is detected, from among data to be transmitted after the congestion is detected, the server stores, in a second S queue, data other than data for the destination for which the congestion is detected. If congestion is detected, from among data to be transmitted after the congestion is detected, the server stores, in a D queue, data for a destination for which the congestion is detected. After the data is stored in the first S queue, the server reads data stored in the second S queue and transmits it. After the data is stored in the first S queue, the server reads the data stored in the D queue, controls a bandwidth thereof, and transmits the data in the D queue.

12 Claims, 18 Drawing Sheets

FIG.6

| QUEUE NUMBER | 1 | 2 | ... | 10 | ... | n |
|---|---|---|---|---|---|---|
| S QUEUE 1 | DATA C1 | DATA C2 | ... | DATA C10 | ... | - |
| S QUEUE 2 | DATA B1 | DATA B2 | ... | - | ... | - |
| D QUEUE | DATA A1 | - | ... | - | ... | - |

FIG.7

| QUEUE NUMBER | MAXIMUM QUEUE LENGTH | QUEUE LENGTH | BANDWIDTH INFORMATION |
|---|---|---|---|
| S QUEUE 1 | 128 | 30 | 50 |
| S QUEUE 2 | 128 | 0 | 50 |
| D QUEUE | 64 | 10 | 20 |

FIG.8

| QUEUE NUMBER | CONGESTION POINT IDENTIFIER | DESTINATION |
|---|---|---|
| S QUEUE 1 | - | ANY |
| S QUEUE 2 | - | - |

FIG.9

| QUEUE NUMBER | CONGESTION POINT IDENTIFIER | DESTINATION |
|---|---|---|
| S QUEUE 1 | - | - |
| S QUEUE 2 | - | ANY |
| D QUEUE | 1 | A |

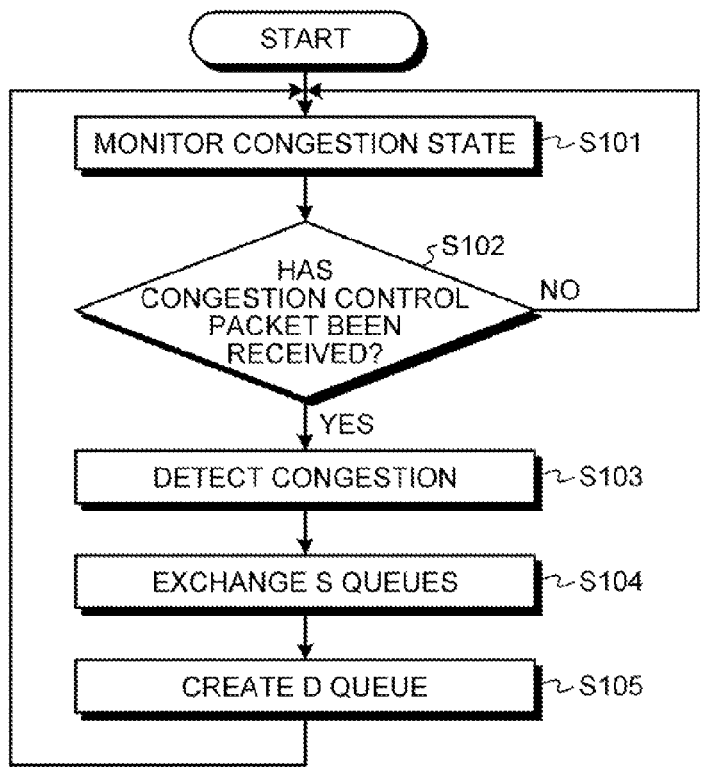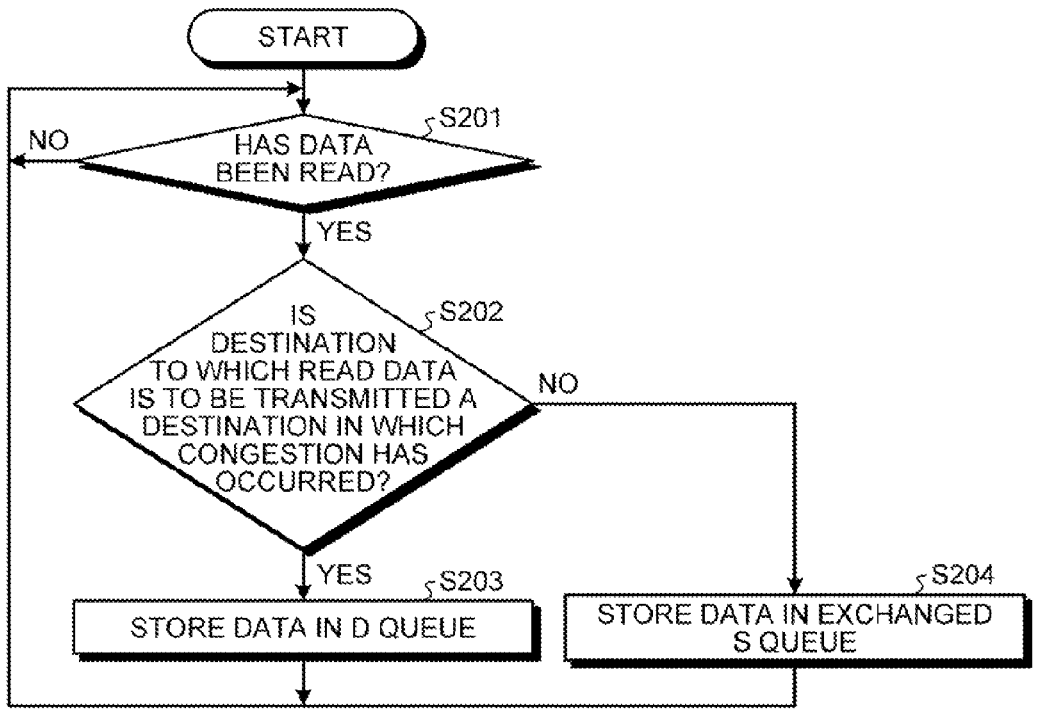

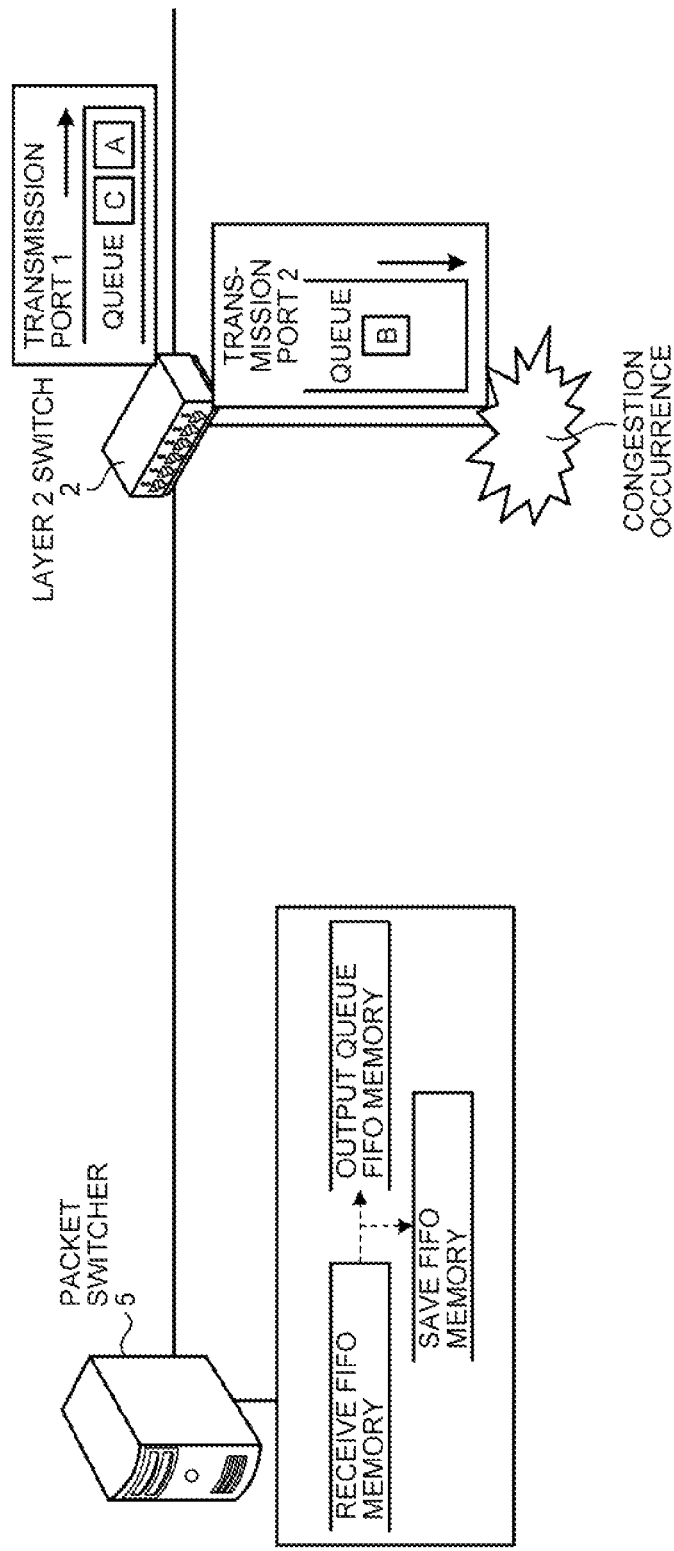

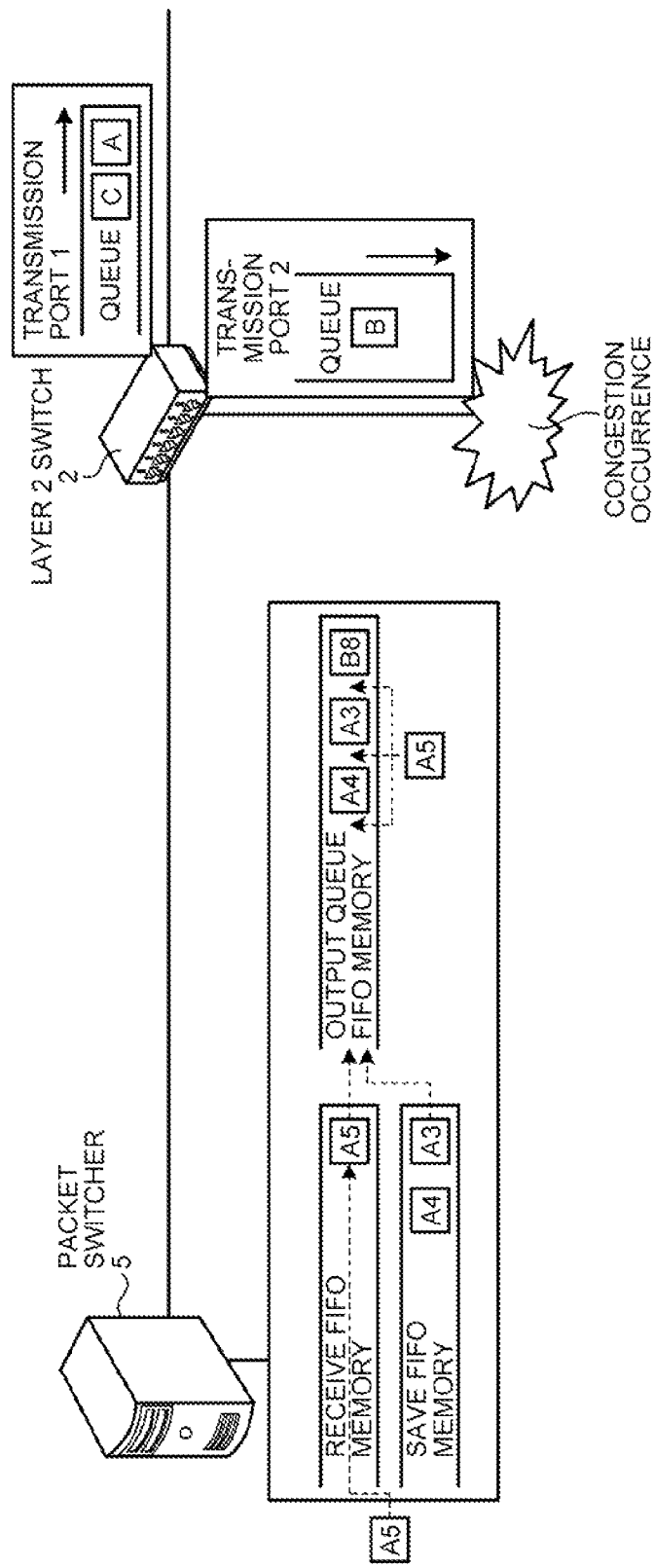

COMPUTER READABLE STORAGE MEDIUM STORING CONGESTION CONTROL PROGRAM, INFORMATION PROCESSING APPARATUS, AND CONGESTION CONTROL METHOD

CROSS-REFERENCE TO RELATED APPLICATION

This application is based upon and claims the benefit of priority of the prior Japanese Patent Application No. 2010-276363, filed on Dec. 10, 2010, the entire contents of which are incorporated herein by reference.

FIELD

The embodiments discussed herein are directed to congestion control of data.

BACKGROUND

If congestion in a network constituted by, for example, servers and layer 2 switches, makes the establishment of communications difficult, the servers prevent the congestion from worsening. To prevent worsening of congestion, the servers performs, for example, a rate adjustment by changing a bandwidth used when data, such as packets or frames, are transmitted from a queue.

The rate adjustment performed by a server will be specifically described with reference to FIGS. 18 and 19. FIG. 18 is a schematic diagram illustrating an example of a server that transmits data by using a single queue. FIG. 19 is a schematic diagram illustrating an example of a server that transmits data by using queues provided for respective destination addresses.

A server 1 illustrated in FIG. 18 stores data addressed to a destination address A, data addressed to a destination address B, and data addressed to a destination address C in a single queue and transmits them to a layer 2 switch 2 in the order they are stored. The server 1 illustrated in FIG. 19 creates a queue for the destination address A, a queue for the destination address B, and a queue for the destination address C and transmits the data to the layer 2 switch 2 in the order they are stored in the queues. The layer 2 switch 2 illustrated in FIGS. 18 and 19 transmits, through a transmission port 1, the data addressed to the destination address A or C received from the server 1 and transmits, through a transmission port 2, the data addressed to the destination address B received from the server 1.

For the network illustrated in FIGS. 18 and 19, it is assumed that congestion occurs at the transmission port 1 in the layer 2 switch 2 and that the server detects the congestion. In the case illustrated in FIG. 18, the server 1 prevents the congestion from worsening by performing a rate adjustment of an output port that is formed by a single queue until the congestion is relieved. In the case illustrated in FIG. 19, the server 1 performs a rate adjustment on the queues that output data addressed to the destination addresses A and C, which worsen the congestion, and does not perform a rate adjustment on the queue that outputs data addressed to the destination address B, which does not affect the congestion.

Patent Document 1: Japanese Laid-open Patent Publication No. 2001-177575

Patent Document 2: Japanese Laid-open Patent Publication No. 63-102527

However, the conventional technology has a problem in that data is not efficiently transmitted.

For example, in the method illustrated in FIG. 18, because the rate adjustment is performed on the data addressed to the destination address B that does not affect the congestion, a transmission delay or the like occurs with respect to the data addressed to the destination address B. Accordingly, the method illustrated in FIG. 18 may cause an unwanted transmission delay, and therefore it is hard to transmit data efficiently.

In the method illustrated in FIG. 19, because the rate adjustment is not performed on the data addressed to the destination address B that does not affect the congestion, it is possible to avoid a transmission delay or the like with respect to the data addressed to the destination address B. However, the server 1 uses queues for respective data destinations and a large amount of memory for queues. For example, if five layer 2 switches, each having 48 ports, are connected to a server having 234 queues and if a single queue is 4000 bytes, the amount of memory of the server is 234×4000=936000 bytes. Accordingly, the method illustrated in FIG. 19 uses the large amount of memory, and thus it is hard to efficiently transmit data.

SUMMARY

According to an aspect of an embodiment of the invention, a computer-readable, non-transitory medium storing therein a congestion control program causing a computer to execute a process includes: storing data in a first queue; transmitting the data stored in the first queue; storing, when a congestion is detected by a relay device that receives the data and relays the data to a destination, first data for a destination for which the congestion is detected in a second queue from among data to be transmitted after the congestion is detected; storing second data other than the first data in a third queue from among the data to be transmitted after the congestion is detected; and reading and transmitting the first data stored in the second queue and the second data stored in the third queue while controlling a bandwidth of the first data after all the data stored in the first queue are transmitted.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a schematic diagram illustrating an example of a transmission queue in a queue area;

FIG. 7 is a schematic diagram illustrating an example of information stored in a transmission queue configuration table;

FIG. 8 is a schematic diagram illustrating an example of information stored in a transmission queue management table before congestion is detected;

FIG. 9 is a schematic diagram illustrating an example of information stored in the transmission queue management table after congestion is detected;

FIG. 10 is a flowchart illustrating the flow of a congestion detecting process performed by the server according to the first embodiment;

FIG. 11 is a flowchart illustrating the flow of a data storing process performed at the time of congestion according to the first embodiment;

FIG. 20 is a schematic diagram illustrating an example of a packet switcher that includes a receive FIFO memory and a save FIFO memory to transmit packets; and FIG. 21 is a schematic diagram illustrating a control example when a congestion is relieved in the packet switcher that includes the receive FIFO memory and the save FIFO memory to transmit packets.

DESCRIPTION OF EMBODIMENTS

Figure 1:
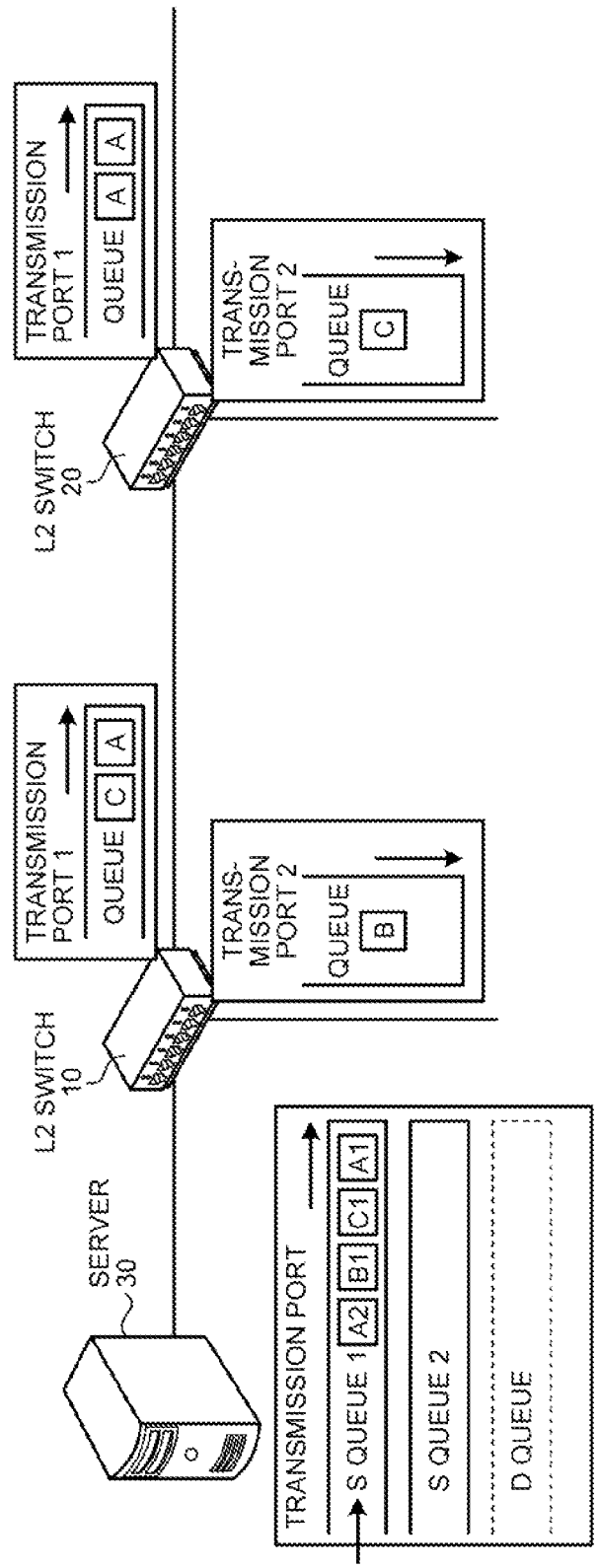
FIG. 1 is a schematic diagram illustrating the overall configuration of a system according to a first embodiment.

Embodiments of the present invention will be described in detail below with reference to the accompanying drawings. The present invention is not limited the embodiments. Furthermore, the embodiments can be appropriately used in combination as long as processes do not conflict with each other.

In addition to the method for preventing the aggravation of the congestion described above, it will be first described about a case where the congestion is prevented from worsening but the order of data is not guaranteed after the congestion is relieved. FIG. 20 is a schematic diagram illustrating an example of a packet switcher 5 that includes a receive FIFO memory and a save FIFO memory to transmit packets.

The packet switcher 5 illustrated in FIG. 20 stores received packets in the receive FIFO memory. Then, the packet switcher 5 reads the packets from the receive FIFO memory and stores the packets in an output queue FIFO memory until a congestion is detected, and then reads the packets from the output queue FIFO memory by using an FIFO control and transmits the packets. In contrast, if the congestion is detected, the packet switcher 5 reads packets that affect the congestion from the receive FIFO memory and saves the packets in the save FIFO memory. In this way, the packet switcher 5 can inhibit the transmission of the packets that affect the congestion, thus preventing the congestion from getting worse.

However, the packet switcher 5 does not guarantee the order of the data after the congestion is relieved. FIG. 21 is a schematic diagram illustrating a control example when a congestion is relieved in the packet switcher that includes the receive FIFO memory and the save FIFO memory to transmit packets. The example illustrated in FIG. 21 indicates that the congestion is relieved in the state in which the packets A3 and A4 are stored in the save FIFO memory and that a new packet A5 becomes a packet to be transmitted. It is assumed that the packets A3, A4, and A5 are transmitted in ascending numerical order.

In such a case, because the congestion has been relieved, the packet switcher 5 sequentially reads the packets A3 and A4 stored in the save FIFO memory and stores them in the output queue FIFO memory. Furthermore, the packet switcher 5 stores, in the receive FIFO memory, the packet A5 that is a packet to be transmitted after the congestion is relieved and then stores it in the output queue FIFO memory.

At this time, there is a possibility that the order of the packets is changed depending on the time at which the packet A3 or A4 is read from the save FIFO memory and the time at which the packet A5 is read from the receive FIFO memory. For example, if the packet A5 is read after reading the packet A3 and before reading the packet A4, the packets A3, A4, and A5 are stored in the order of A3, A5, and A4 in the output queue FIFO memory. Furthermore, for example, if the packet A5 is read before reading the packet A3, the packets A3, A4, and A5 are stored in the order of A5, A3, and A4 in the output queue FIFO memory. In other words, because the packets are transmitted in the order they are stored in the output queue FIFO memory in any cases, the packets are not transmitted in the correct order, and thus the packets are inconsistent.

As described above, the technology for transmitting packets by arranging the receive FIFO memory and the save FIFO memory is not effective because a congestion can be prevented from worsening but the order of data is not guaranteed after the congestion is relieved. In the following embodiments, a description is given of a computer readable storage medium that stores a congestion control program, an information processing apparatus, and a congestion control method that can be used for preventing congestion from worsening and guaranteeing the order of data after relieving the congestion.

[a] First Embodiment

Figure 2:
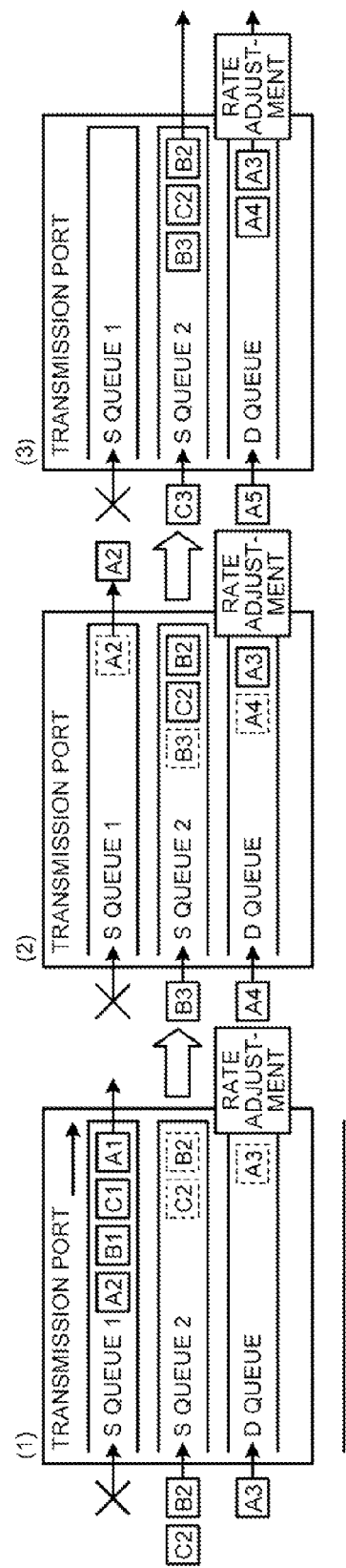
FIG. 2 is a schematic diagram illustrating an example of the queue control performed by a server when congestion occurs in the system according to the first embodiment.

The overall configuration of a system according to the first embodiment will be described with reference to FIGS. 1 and 2. Herein, examples of the control performed until congestion is detected and the control performed after congestion is detected will be described. FIG. 1 is a schematic diagram illustrating the overall configuration of the system according to the first embodiment. FIG. 2 is a schematic diagram illustrating an example of the queue control performed by a server when congestion occurs in the system according to the first embodiment. As illustrated in FIG. 1, the system according to the first embodiment includes a layer 2 switch (hereinafter, referred to as an L2 switch) 10, an L2 switch 20, and a server 30, which are connected to each other.

The L2 switch 10 is, for example, a switching hub that controls the relay of data between the server 30 and the L2 switch 20, the relay of data between the server 30 and other devices, the relay of data between the L2 switch 20 and other devices, and the like. For example, when receiving data addressed to the destination address A or the destination address C from the server 30, the L2 switch 10 transmits the received data addressed to the destination address A or the destination address C to the destination through the transmission port 1. Furthermore, when receiving data addressed to the destination address B from the server 30, the L2 switch 10 transmits the received data addressed to the destination address B to the destination through the transmission port 2.

The L2 switch 20 is, for example, a switching hub that controls the relay of data between the server 30 and other devices, the relay of data between the L2 switch 10 and other devices, and the like. For example, when receiving data addressed to the destination address A from the L2 switch 10, the L2 switch 20 transmits the received data addressed to the destination address A to the destination through the transmission port 1. Furthermore, when receiving data addressed to the destination address C from the L2 switch 10, the L2 switch 20 transmits the received data addressed to the destination address C to the destination through the transmission port 2.

In the above, the example of using the L2 switch has been described; however, the present invention is not limited thereto. For example, it is possible to use a router, a layer 3 switch, or the like. The data exchanged in the system illustrated in FIG. 1 are, for example, flows, packets, frames, various requests, and various responses and may be any information as long as the information is exchanged in a commonly used information processing system.

The server 30 may be a server that provides a client terminal with Web services or databases or may be a computer that uses services, such as Web services, databases, or the like.

The server 30 stores data to be transmitted in a static queue (hereinafter, referred to as S queue) 1 that corresponds to a first queue. Then, the server 30 reads the data stored in the S queue 1 and transmits the data. For example, as illustrated in FIG. 1, the server 30 stores the received or the created data A1, C1, B1, and A2 in the order A1, C1, B1, and A2 in the S queue 1, and transmits the data in the order they are stored. The data A or the like that is described in the embodiments indicates data for the destination A, whereas the symbol "A1, A2" indicates the order that the data are transmitted. Specifically, the relation between the data A1 and the data A2 indicates that both data are for the destination A and that the data A1 is to be transmitted before the data A2.

When detecting congestion, the server 30 stores, in S queue 2 that corresponds to a second queue, data other than data for a destination for which the congestion is detected from among data to be transmitted after the congestion is detected. Furthermore, when detecting the congestion, the server 30 stores, in a dynamic queue (hereinafter, referred to as D queue) that corresponds to a third queue, the data for the destination for which the congestion is detected from among the data to be transmitted after the congestion is detected.

For example, it is assumed that the transmission port 1 of the L2 switch 20 illustrated in FIG. 1 detects that congestion occurs on a transmission path to the destination address A. In such a case, as illustrated in (1) of FIG. 2, the server 30 stores, in the S queue 2, the data B2 and C2, which are data other than data for the destination A for which the congestion is detected, from among the data B2, C2, and A3 that are data to be transmitted after the congestion is detected. Furthermore, the server 30 stores, in the D queue, the data A3 that is data for the destination for which the congestion is detected from among the data B2, C2, and A3 that are data to be transmitted after the congestion is detected.

Then, after the data stored in the S queue 1 is transmitted, the server 30 reads the data stored in the S queue 2 and transmits the data. Furthermore, after the data stored in the S queue 1 is transmitted, the server 30 reads the data stored in the D queue, controls its bandwidth, and transmits the data.

In the case described above, because the data is stored in the S queue 1 before the congestion even though data are stored in the S queue 2 and the D queue, the server 30 transmits the data stored in the S queue 1 before transmitting the data stored in the S queue 2 and the D queue. Specifically, as illustrated in (2) of FIG. 2, the server 30 does not transmits the data stored in the S queue 2 and the data stored in the D queue until the transmission of the data A2 finally stored in the S queue 1 is completed. During this time, the server 30 stores the data A4 in the D queue and stores the data B3 in the S queue 2, both of which are the new transmission targets.

Then, as illustrated in (3) of FIG. 2, upon transmitting the data A2 finally stored in the S queue 1, the server 30 sequentially reads data B2, C2, and B3 stored in the S queue 2 and transmits them. Similarly, as illustrated in (3) of FIG. 2, upon transmitting the data A2 finally stored in the S queue 1, the server 30 sequentially reads the data A3 and A4 stored in the D queue, controls their bandwidth, and transmits the data.

Thereafter, until the congestion is relieved, the server 30 stores, in the S queue 2, the data C3 or the like that is data other than the data for the destination for which the congestion is detected and stores, in the D queue, the data A5 or the like that is data for the destination for which the congestion is detected. Specifically, until the congestion is relieved, the server 30 does not store data in the S queue 1 that is used before the congestion is detected.

As described above, according to the first embodiment, the server 30 controls the transmission by using a single queue until the congestion is detected. If congestion is detected, the server 30 controls the transmission by storing, in another queue, data other than data for the destination for which the congestion is detected and controls the transmission by storing data for the destination for which the congestion is detected in a queue that is used to control the bandwidth of the data. Specifically, the server 30 exchanges queues that are used to store the data before and after the congestion is detected and performs a rate adjustment only on data that affect the congestion. Furthermore, even when several data destinations are present, the server 30 can still perform the above process by using at least three queues.

Accordingly, when congestion occurs, because the server 30 according to the first embodiment stores in the different queues data that affect the congestion and data that do not affect the congestion, the server can prevent a transmission delay of the destination data that do not affect the congestion. Furthermore, because the server 30 does not prepare queues for all destinations, the number of queues is reduced. Furthermore, because the server 30 starts the transmission of the destination data that do not affect the congestion and the destination data that affect the congestion after the transmission of data stored before the congestion is completed, the reversal of the order of the transmission can be prevented. Accordingly, the server 30 according to the first embodiment can perform efficient data transmission.

Configuration of Each Device

In the following, the configuration of each device illustrated in FIG. 1 will be described. Here, the configuration of the L2 switch and the server will be described. The L2 switch 10 and the L2 switch 20 illustrated in FIG. 1 have the same configuration; therefore, the configuration of the L2 switch 10 will only be described here.

Configuration of L2 Switch

Figure 3:
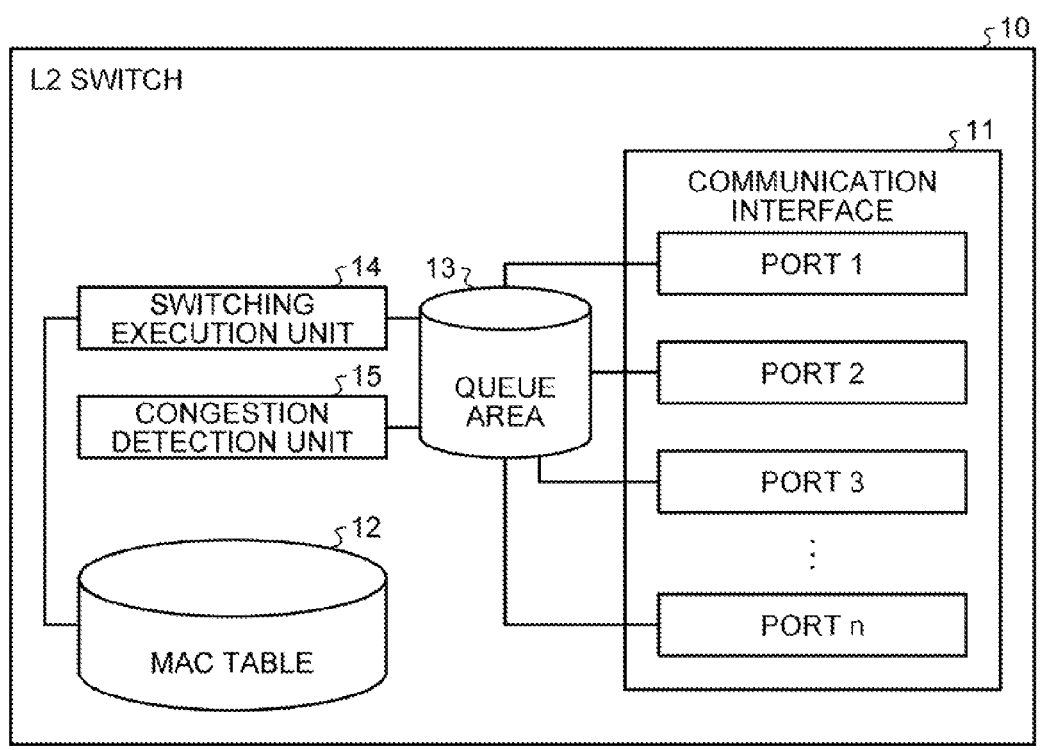
FIG. 3 is a block diagram illustrating the configuration of an L2 switch.

FIG. 3 is a block diagram illustrating the configuration of the L2 switch. As illustrated in FIG. 3, the L2 switch 10 includes a communication interface 11, a media access control (MAC) table 12, a queue area 13, a switching execution unit 14, and a congestion detection unit 15. The MAC table 12 and the queue area 13 are storing units that are arranged in a memory or the like.

The communication interface 11 controls the communication with another device and has ports 1 to n (n is a natural number) to which a MAC address or the like is allocated. For example, the communication interface 11 receives data from each port and outputs the data to the switching execution unit 14 or the congestion detection unit 15. Furthermore, the communication interface 11 transmits the data that is output from the switching execution unit 14 or the congestion detection unit 15 to the destination via the port specified by the switching execution unit 14 or the congestion detection unit 15.

The MAC table 12 stores therein path information related to the destination of data. For example, the MAC table 12 stores therein address information, such as information on MAC address contained in data or in a header or information on an Internet Protocol (IP) address, by associating the address information with information on a destination device or on network equipment and with a port that corresponds to the destination. The MAC table 12 can also be controlled using a static routing method for storing previously fixed information or can also be dynamically controlled in such a manner that data is updated in accordance with information from another device.

The queue area 13 has a receive queue and a transmission queue, which are controlled on a FIFO (first-in first-out) basis for each port in the communication interface 11. For example, the queue area 13 is received by the port 1 in the communication interface 11. The switching execution unit 14 stores, at the end of the receive queue, data contained in any one of the receive queues.

The switching execution unit 14 controls the switching of data and transmits the data to the destination. For example, when reading data from the receive queue in the port 1, the switching execution unit 14 refers to the MAC table 12 and specifies the destination from the address information contained in, for example, a header of the data. Furthermore, the switching execution unit 14 refers to the MAC table 12 and specifies the port to be connected to the specified destination. Then, the switching execution unit 14 stores the data in a transmission queue in the specified port. Furthermore, the switching execution unit 14 reads each of the data contained in each of the first portions of the transmission queues in the ports and transmits the read data to the destinations from each of the ports.

The congestion detection unit 15 detects congestion by using a congestion control method prescribed by IEEE 802.1Qau and periodically transmits, to each device connected to the L2 switch 10 until the congestion is relieved, a congestion control packet that indicates the detection of the congestion. The congestion detection unit 15 detects congestion by monitoring the retaining state of each transmission queue. Then, the congestion detection unit 15 creates a congestion control packet and transmits it from each port. If the congestion is relieved, the congestion detection unit 15 stops the transmission of the congestion control packet.

Figure 4:
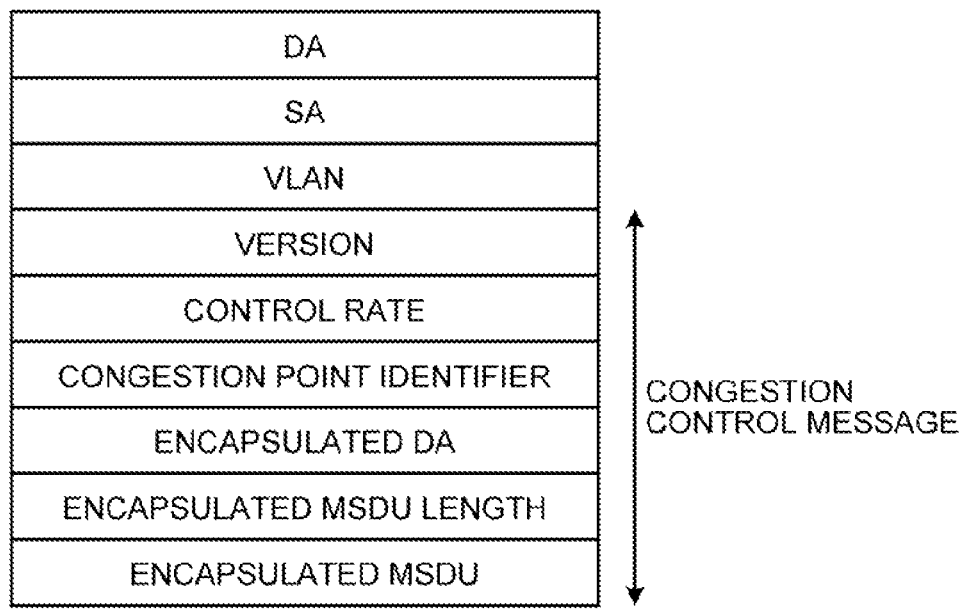
FIG. 4 is a schematic diagram illustrating an example of a congestion control packet transmitted by the L2 switch.

FIG. 4 is a schematic diagram illustrating an example of a congestion control packet transmitted by the L2 switch. As illustrated in FIG. 4, the congestion control packet contains "DA, SA, and a virtual local area network (VLAN)". Furthermore, the congestion control packet further contains a congestion control message, i.e., "a version, a control rate, a congestion point identifier, the Encapsulated DA, an Encapsulated Mac service data unit (MSDU) length, and the Encapsulated MSDU". These six items are a congestion control message. The symbol "DA" indicates the destination address of the congestion control packet and is, for example, the destination address of a packet subjected to sampling. If the sampled packet is transmitted from the server 30, the MAC address of the server 30 is stored in the "DA".

The symbol "SA" indicates the transmission source address of the congestion control packet. For example, the MAC address of the L2 switch 10 is stored in the "SA". If a network is configured using a VLAN, an identifier for the VLAN contained in the sampled packet is in the "VLAN". In the "version", a version of the sampled packet is stored. In the "control rate", information on the bandwidth used at the time of congestion is stored. The "control rate" can also be previously determined by, for example, an administrator or also can be specified by the congestion detection unit 15 in accordance with the activity ratio of the network or the bandwidth state of the queue.

The "congestion point identifier" indicates a detection point of congestion. For example, the MAC address of the port is used for the "congestion point identifier". The "Encapsulated DA" indicates address information on the destination for which congestion occurs. The destination address of the sampled packet is stored therein. For example, if a sampled packet is transmitted to the address A, the address A is stored in the "Encapsulated DA". The "Encapsulated MSDU length" is the length of a frame body that is received by a MAC layer from a higher layer and is, for example, the length of the sampled packet. The "Encapsulated MSDU" is a frame body that is received by the MAC layer from a higher layer and is information, such as the destination of the sampled packet, the transmission source, information on the VLAN, and a protocol data unit (PDU).

Configuration of Server

Figure 5:
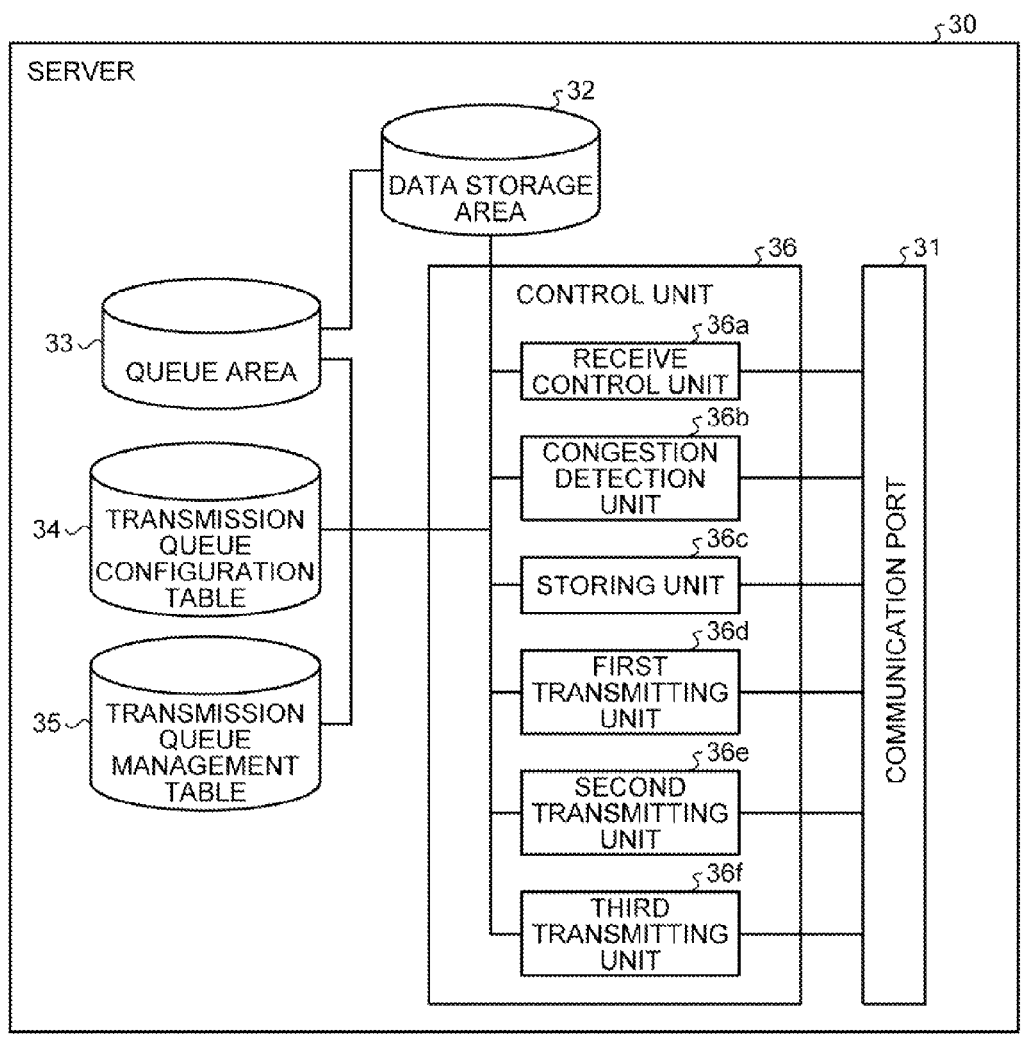
FIG. 5 is a block diagram illustrating the configuration of a server.

FIG. 5 is a block diagram illustrating the configuration of a server. As illustrated in FIG. 5, the server 30 includes a communication port 31, a data storage area 32, a queue area 33, a transmission queue configuration table 34, a transmission queue management table 35, and a control unit 36. The data storage area 32, the queue area 33, the transmission queue configuration table 34, and the transmission queue management table 35 are storing units arranged in a memory.

The communication port 31 is an interface to which an MAC address is allocated and that controls communication with another device. For example, the communication port 31 transmits, to the destination, data that is output from a first transmitting unit 36*d*, a second transmitting unit 36*e*, and a third transmitting unit 36*f* in the control unit 36. Furthermore, the communication port 31 outputs the congestion control packet received from the L2 switch 10 to a receive control unit 36*a* or a congestion detection unit 36*b*.

The data storage area 32 stores therein data and programs for the various processes performed by the control unit 36 and stores therein data received from outside. For example, the data storage area 32 stores therein data that is to be transmitted and that is created by the control unit 36 or the like. Furthermore, the data storage area 32 stores therein data that is stored by the receive control unit 36*a* and that is received by the communication port 31.

The queue area 33 includes a transmission queue that stores therein data transmitted from the communication port 31 and includes a receive queue that stores therein data received by the communication port 31. For example, the transmission queue includes S queue 1 that stores therein data to be transmitted before congestion is detected. Furthermore, if congestion is detected, from among the data that are to be transmitted after the congestion is detected, the transmission queue includes the S queue 2 that stores therein data other than data for the destination for which the congestion is detected. Furthermore, if congestion is detected, from among the data that are to be transmitted after the congestion is detected, the transmission queue includes the D queue that stores therein data for the destination for which the congestion is detected. The receive queue stores therein data received by the communication port 31.

In the following, an example of the transmission queue will be specifically described. FIG. 6 is a schematic diagram illustrating an example of a transmission queue in a queue area. As illustrated in FIG. 6, the queue area is constituted by dividing the area into "queue number, 1, 2, . . . , 10, . . . , and n (n is a natural number)". The "queue number" is an identifier that uniquely identifies the transmission queue and is set by, for example, an administrator. The order that the data are stored is represented by "1 to n". The data are sequentially read and transmitted in ascending numerical order.

In the case illustrated in FIG. 6, the "S queue 1" is a queue constituted by 10 data, i.e., data C1, data C2, . . . , and data C10. The data are sequentially read and transmitted from the data C1. The "S queue 2" is a queue constituted by two data, i.e., data B1 and data B2. The data are sequentially read and transmitted from the data B1. The "D queue" is a queue constituted by only data A1 and data A1 is read and transmitted.

In the queue area 33, an update is performed every time data is transmitted from each transmission queue or data is stored in each queue by each of the transmitting units in the control unit 36. For example, if the data C1 that is stored at the top of the S queue 1 is read and transmitted, the first transmitting unit 36*d* moves the "data C2", which is stored in "2" of the "queue number=the S queue 1" in the queue area 33, to "1". Specifically, if the first data in the S queue 1 is transmitted, the first transmitting unit 36*d* moves the data that are stored after the transmitted data to the immediately previous storing locations. Furthermore, if the state of the queue area 33 is the state illustrated in FIG. 6 and if new data A2 is stored in the D queue, the third transmitting unit 36*f* stores the data A2 in "2" of the "queue number=the D queue" in the queue area 33.

The queue area 33 does not always have the D queue. A storing unit 36*c*, which will be described later, can also dynamically create the D queue by reserving a region in which the D queue can be created. Each of the queues included in the queue area 33 can be controlled using, for example, the FIFO method.

The transmission queue configuration table 34 stores therein information on the configuration of transmission queues included in the queue area 33. FIG. 7 is a schematic diagram illustrating an example of information stored in a transmission queue configuration table. As illustrated in FIG. 7, the transmission queue configuration table 34 stores therein "queue number, maximum queue length, queue length, and bandwidth information". The "queue number" is an identifier that uniquely identifies the transmission queue and is set by, for example, an administrator. The "maximum queue length" indicates the maximum amount of data that can be accumulated in the transmission queue that is set by, for example, an administrator. The "queue length" indicates the amount of data accumulated in the transmission queue and is dynamically updated in accordance with the state of each of the transmission queues in which the data are stored. The "bandwidth information" indicates the bandwidth allocated to the transmission queue and is dynamically updated by, for example, the congestion detection unit 36*b*.

In the case illustrated in FIG. 7, a bandwidth of 50 Mbps is allocated to the "S queue 1", a maximum queue length of 128 Kbytes can be stored in the "S queue 1", and a queue length of 30 Kbytes is currently stored in the "S queue 1". In the "S queue 2", a bandwidth of 50 Mbps is allocated, a maximum queue length of 128 Kbytes can be stored, and data are not currently stored. In the "D queue", the bandwidth of 20 Mbps is allocated, the maximum queue length of 64 Kbytes can be stored, and the queue length of 10 Kbytes is currently stored.

The information illustrated in FIG. 7 is only an example; therefore, other information can also be stored. Furthermore, the units in which the maximum queue length is expressed are only an example and are not limited thereto. The information stored in the transmission queue configuration table 34 is updated as needed in accordance with the state of the queue included in the queue area 33. For example, if the queue area 33 includes two D queues, the transmission queue configuration table 34 also stores therein information on the configuration of the two D queues.

The transmission queue management table 35 stores therein data to be stored, the congestion state, or the like for each transmission queue included in the queue area 33. FIG. 8 is a schematic diagram illustrating an example of information stored in a transmission queue management table before congestion is detected. FIG. 9 is a schematic diagram illustrating an example of information stored in the transmission queue management table after congestion is detected.

As illustrated in FIGS. 8 and 9, the transmission queue management table 35 stores therein "queue number, congestion point identifier, and destination" in an associated manner. The "queue number" is an identifier for uniquely identifying the transmission queue. The "congestion point identifier" is the MAC address of the port in the L2 switch 10 in which congestion is detected. The "destination" indicates the destination of data that are to be stored in the transmission queue.

In the example illustrated in FIG. 8, data for all of the destinations are stored in the "S queue 1" and no data are stored in the "S queue 2". In the example illustrated in FIG. 9, no data are stored in the "S queue 1"; data other than data addressed to the destination address A are stored in the "S queue 2"; and data addressed to the destination address A that is output from the port of the MAC address 1 of the L2 switch 10 is stored in the "D queue". The transmission queue management table 35 is dynamically updated by each of the storing units in the control unit 36.

The control unit 36 is an electronic circuit, such as a central processing unit (CPU). The control unit 36 includes an internal memory for storing therein a control program, such as an operating system (OS), storing programs prescribing various kinds of procedures, and storing appropriate data. The control unit 36 includes the receive control unit 36*a*, the congestion detection unit 36*b*, the storing unit 36*c*, the first transmitting unit 36*d*, the second transmitting unit 36*e*, and the third transmitting unit 36*f* and performs various processes using these units.

The receive control unit 36*a* stores, in the data storage area 32, the data received by the communication port 31 and outputs the data received by the communication port 31 to the congestion detection unit 36*b*. Furthermore, if the data received by the communication port 31 is a congestion control packet, the receive control unit 36*a* stores the received congestion control packet in the data storage area 32 and outputs it to the congestion detection unit 36*b*.

The congestion detection unit 36*b* detects congestion in accordance with the congestion control packet received from, for example, the L2 switch 10. For example, the congestion detection unit 36*b* detects congestion if a congestion control packet is received from the receive control unit 36*a*. Then, the congestion detection unit 36*b* obtains "the control rate, the congestion point identifier, and the Encapsulated DA" contained in the congestion control packet and outputs the obtained information to the storing unit 36c.

Furthermore, the congestion detection unit 36b creates, in the transmission queue management table 35, the record for the D queue indicating that the obtained "Encapsulated DA" corresponds to the "destination" and stores, in a "congestion point identifier" in the created record, a "congestion point identifier" that is obtained from the congestion control packet. Furthermore, after detecting the congestion, the congestion detection unit 36b changes the S queues in which data other than the data for the congestion destination is stored. Specifically, the congestion detection unit 36b creates the state, which is illustrated in FIG. 9 and which is the state after the detection of congestion, from the state, which is illustrated in FIG. 8 and which is the state before the detection of congestion. Furthermore, the congestion detection unit 36b creates a record for the D queue in the transmission queue configuration table 34 and stores, in the "bandwidth information" in the created record, the "control rate" obtained from the congestion control packet. At this time, the congestion detection unit 36b stores, in the "maximum queue length" in the created record for the D queue, information that is previously set by, for example, an administrator.

The storing unit 36c stores data to be transmitted in each queue in accordance with each state in which congestion is not detected and in which congestion is detected. For example, the storing unit 36c reads data that are stored in the data storage area 32 and that are to be transmitted in the S queue 1 until congestion is detected by the congestion detection unit 36b. When the storing unit 36c refers to the transmission queue management table 35, it is assumed that the state of the transmission queue management table 35 is like that illustrated in FIG. 8. Specifically, it is assumed that no record for the D queue is in the transmission queue management table 35 and that the "destination" stored in the S queue 1 is "any". In such a case, the storing unit 36c sequentially reads data stored in the data storage area 32 to be transmitted. Then, the storing unit 36c stores the read data to be transmitted in the S queue 1 in the queue area 33 and updates the "queue length" of the S queue 1 in the transmission queue configuration table 34 by the length of read data to be transmitted.

Furthermore, when congestion is detected, from among the data to be transmitted after congestion is detected, the storing unit 36c stores, in the S queue 2, data other than data for the destination for which congestion is detected. For example, if congestion is detected on the transmission path of the destination A by the congestion detection unit 36b, from among data to be transmitted stored in the data storage area 32, the storing unit 36c reads data other than data for the destination A and stores them in the S queue 2.

It is assumed that, when the storing unit 36c refers to the transmission queue management table 35, the state of the transmission queue management table 35 is like that illustrated in FIG. 9. Specifically, it is assumed that the transmission queue management table 35 has a record in which "destination" stored in the D queue is "A" and the "destination" stored in the S queue 2 is "any". In such a case, from among the data to be transmitted stored in the data storage area 32, the storing unit 36c sequentially reads data other than data addressed to the destination address A and stores them in the S queue 2 in the queue area 33. Then, the storing unit 36c updates the "queue length" of the S queue 2 in the transmission queue configuration table 34 by the length of read data to be transmitted.

Furthermore, if congestion is detected, from among data to be transmitted after congestion is detected, the storing unit 36c creates a D queue and stores, in the D queue, data for the destination for which the congestion is detected. For example, if congestion is detected on the transmission path of the destination A by the congestion detection unit 36b, the storing unit 36c creates the D queue in the queue area 33; reads data for the destination A from among data to be transmitted stored in the data storage area 32; and stores them in the D queue.

When the storing unit 36c refers to the transmission queue management table 35, it is assumed that the state of the transmission queue management table 35 is like that illustrated in FIG. 9. Specifically, it is assumed that the transmission queue management table 35 has a record in which "destination" stored in the D queue is "A" and the "destination" stored in the S queue 2 is "any". In such a case, from among the data to be transmitted stored in the data storage area 32, the storing unit 36c sequentially reads data addressed to the destination address A and stores them in the D queue in the queue area 33. Then, the storing unit 36c updates the "queue length" of the D queue in the transmission queue configuration table 34 by the length of read data to be transmitted.

The first transmitting unit 36d reads the data stored in the S queue 1 and transmits it. For example, from among the transmission queues in the queue area 33 illustrated in FIG. 6, the first transmitting unit 36d reads the data stored at the top of the S queue 1. Subsequently, the first transmitting unit 36d refers to the transmission queue configuration table 34 and obtains "bandwidth information=50" that is associated with the S queue 1. Then, the first transmitting unit 36d transmits the data read from the S queue 1 to the destination using a bandwidth of 50 Mbps.

Thereafter, every time the first transmitting unit 36d reads data and transmits it, the first transmitting unit 36d moves the subsequent data to the immediately previous position number. Specifically, the first transmitting unit 36d reads the first data of the S queue 1, i.e., the data stored in the "1" of the S queue 1 illustrated in FIG. 6, and transmits the data. Then, when transmission of all the data stored in the S queue 1 has been completed, the first transmitting unit 36d outputs a transmission completion notification to the second transmitting unit 36e and the third transmitting unit 36f.

After all of the data stored in the S queue 1 are transmitted, the second transmitting unit 36e reads the data stored in the S queue 2 and transmits them. For example, the second transmitting unit 36e receives information, from the first transmitting unit 36d, indicating that all of the data stored in the S queue 1 in the queue area 33 illustrated in FIG. 6 are transmitted. Then, the second transmitting unit 36e reads the data stored at the top of the S queue 2. Subsequently, the second transmitting unit 36e refers to the transmission queue configuration table 34 and obtains the "bandwidth information=50" that is associated with the S queue 2. Then, the second transmitting unit 36e transmits, to the destination using a bandwidth of 50 Mbps, the data that is read from the S queue 2.

Thereafter, every time the second transmitting unit 36e reads data and transmits it, the second transmitting unit 36e moves the subsequent data to the immediately previous position number. Specifically, the second transmitting unit 36e reads the first data of the S queue 2, i.e., the data stored in the "1" of the S queue 2 illustrated in FIG. 6, and transmits the data.

When all of the data stored in the S queue 1 have been transmitted, the third transmitting unit 36f reads the data stored in the D queue, controls its bandwidth, and transmits the data. For example, the third transmitting unit 36f receives information, from the first transmitting unit 36d, indicating that all of the data stored in the S queue 1 in the queue area 33 illustrated in FIG. 6 are transmitted. Then, the third transmitting unit 36f reads the data stored at the top of the D queue. Subsequently, the third transmitting unit 36f refers to the transmission queue configuration table 34 and obtains the "bandwidth information=20" associated with the D queue. Unlike the S queue 1 or 2, the third transmitting unit 36f transmits the data read from the D queue to the destination while limiting the bandwidth to 20 Mbps.

Then, every time the third transmitting unit 36f reads data and transmits it, the third transmitting unit 36f moves the subsequent data to the immediately previous position number. Specifically, the third transmitting unit 36f reads the first data of the D queue, i.e., the data stored in the "1" of the D queue illustrated in FIG. 6, controls its bandwidth, and transmits the data.

Flow of Process

In the following, the flow of various processes performed by the server according to the first embodiment will be described with reference to FIGS. 10 and 11. Here, the flow of a congestion detecting process, the flow of a process for storing data at the time of congestion, and the flow of a process for transmitting data at the time of congestion will be described in the order they are listed in this sentence.

Flow of Congestion Detecting Process

FIG. 10 is a flowchart illustrating the flow of a congestion detecting process performed by the server according to the first embodiment. As illustrated in FIG. 10, the congestion detection unit 36b in the server 30 monitors a congestion state in accordance with the data received by the receive control unit 36a (Step S101).

If the receive control unit 36a receives a congestion control packet (Yes at Step S102), the congestion detection unit 36b detects congestion (Step S103). Then, the congestion detection unit 36b exchanges the S queues in such a manner that data other than data for the destination for which congestion has occurred is stored in the S queue 2 instead of the S queue 1 (Step S104). The storing unit 36c creates a D queue in the queue area 33 (Step S105). At this time, the congestion detection unit 36b updates each of the tables of the transmission queues. Thereafter, a process performed at Step S101 and the subsequent processes are repeated.

Flow of Data Storing Process at Time of Congestion

FIG. 11 is a flowchart illustrating the flow of a data storing process performed at the time of congestion according to the first embodiment. As illustrated in FIG. 11, when the server 30 reads the data to be transmitted from the data storage area 32 (Yes at Step S201), the server 30 determines, using a header or the like of the data, whether the destination to which the read data is to be transmitted is the destination for which congestion has occurred (Step S202).

If the server 30 determines that the read data is to be transmitted to the destination for which congestion has occurred (Yes at Step S202), the storing unit 36c stores the data in the D queue (Step S203). In contrast, if the server 30 determines that the destination to which the read data is to be transmitted is not the destination for which congestion has occurred (No at Step S202), the storing unit 36c stores the data in the exchanged S queue 2 (Step S204). Thereafter, a process performed at Step S201 and the subsequent processes are repeated.

Flow of Data Transmission Process at Time of Congestion

Figure 12:
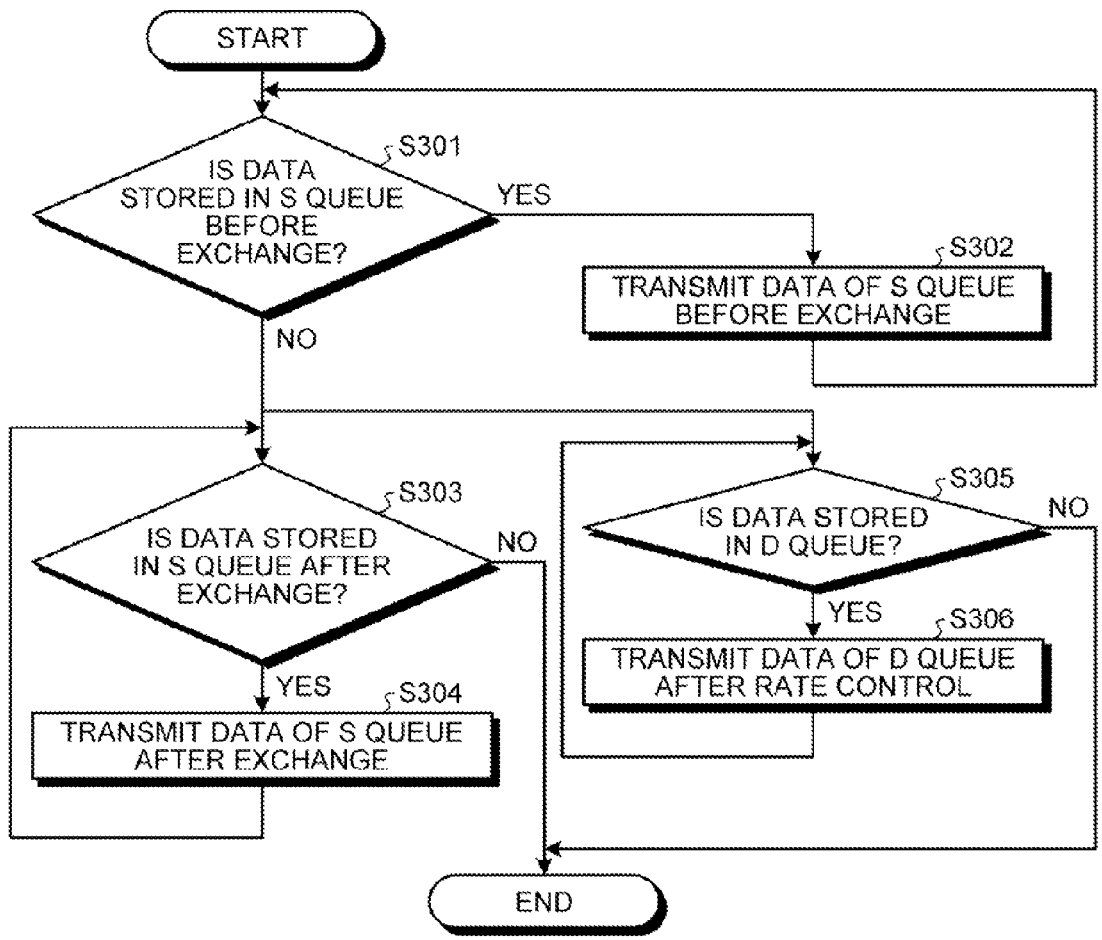
FIG. 12 is a flowchart illustrating the flow of a data transmission process performed at the time of congestion according to the first embodiment.

FIG. 12 is a flowchart illustrating the flow of a data transmission process performed at the time of congestion according to the first embodiment. As illustrated in FIG. 12, if data is stored in the S queue 1 before exchange (Yes at Step S301), the first transmitting unit 36d reads the data stored in the S queue 1 and transmits the data by using the bandwidth associated with the S queue 1 (Step S302). Thereafter, a process performed at Step S301 and the subsequent processes are repeated.

In contrast, if the data is not stored in the S queue 1 that is used before the S queues are changed (No at Step S301), the second transmitting unit 36e determines whether data is stored in the S queue 2 (Step S303). Specifically, if all of the data stored in the S queue 1 are transmitted, the second transmitting unit 36e determines whether data is stored in the S queue 2.

If the second transmitting unit 36e determines that data is stored in the S queue 2 (Yes at Step S303), the second transmitting unit 36e reads the first data stored in the S queue 2 and transmits it to the destination by using the bandwidth associated with the S queue 2 (Step S304). Then, the second transmitting unit 36e repeats the processes by returning to Step S303. In contrast, if the second transmitting unit 36e determines that data is not stored in the S queue 2 (No at Step S303), the second transmitting unit 36e ends the process.

Similarly, if data is not stored in the S queue 1 that is used before the S queues are changed (No at Step S301), the third transmitting unit 36f determines whether data is stored in the D queue (Step S305). Specifically, if all of the data stored in the S queue 1 are transmitted, the third transmitting unit 36f determines whether data is stored in the D queue.

Then, if the third transmitting unit 36f determines that data is stored in the D queue (Yes at Step S305), the third transmitting unit 36f reads the first data stored in the D queue and transmits the data to the destination by using the bandwidth associated with the D queue (Step S306). Thereafter, the third transmitting unit 36f repeats the process by returning to Step S305. In contrast, if the third transmitting unit 36f determines that data is not stored in the D queue (No at Step S305), the third transmitting unit 36f ends the process.

The timing of extracting the data from the S queue 2 performed by the second transmitting unit 36e and the timing of extracting the data from the D queue performed by the third transmitting unit 36f are determined using, for example, a round robin method. For example, the bandwidth is controlled using a round robin scheduling in which data is extracted five times from the D queue in the time period during which data is extracted 10 times from the S queue 2.

Advantage of First Embodiment

According to the first embodiment, it is possible to prevent a transmission delay of data for the destination that is not affected by congestion. Furthermore, the number of queues can be reduced. Furthermore, it is possible to prevent the order of the transmission from being inverted. Accordingly, data can be efficiently transmitted. Furthermore, only two queues, i.e., the S queue 1 and the S queue 2, are arranged except when congestion has not occurred, thus further reducing the amount of memory for the queues.

Furthermore, according to the first embodiment, a large number of queues may not be provisioned to associate the destinations of data with queues. The number of queues to be set can be the number of points in which congestion has occurred. Accordingly, it is expected that the amount of memory that is used for the queues can be reduced or complexity of the function for scheduling a lot of queues can be reduced. Furthermore, by reducing the number of queues, it is also possible to reduce the processing loads for allocating data to the corresponding queue.

[b] Second Embodiment

Figure 13:
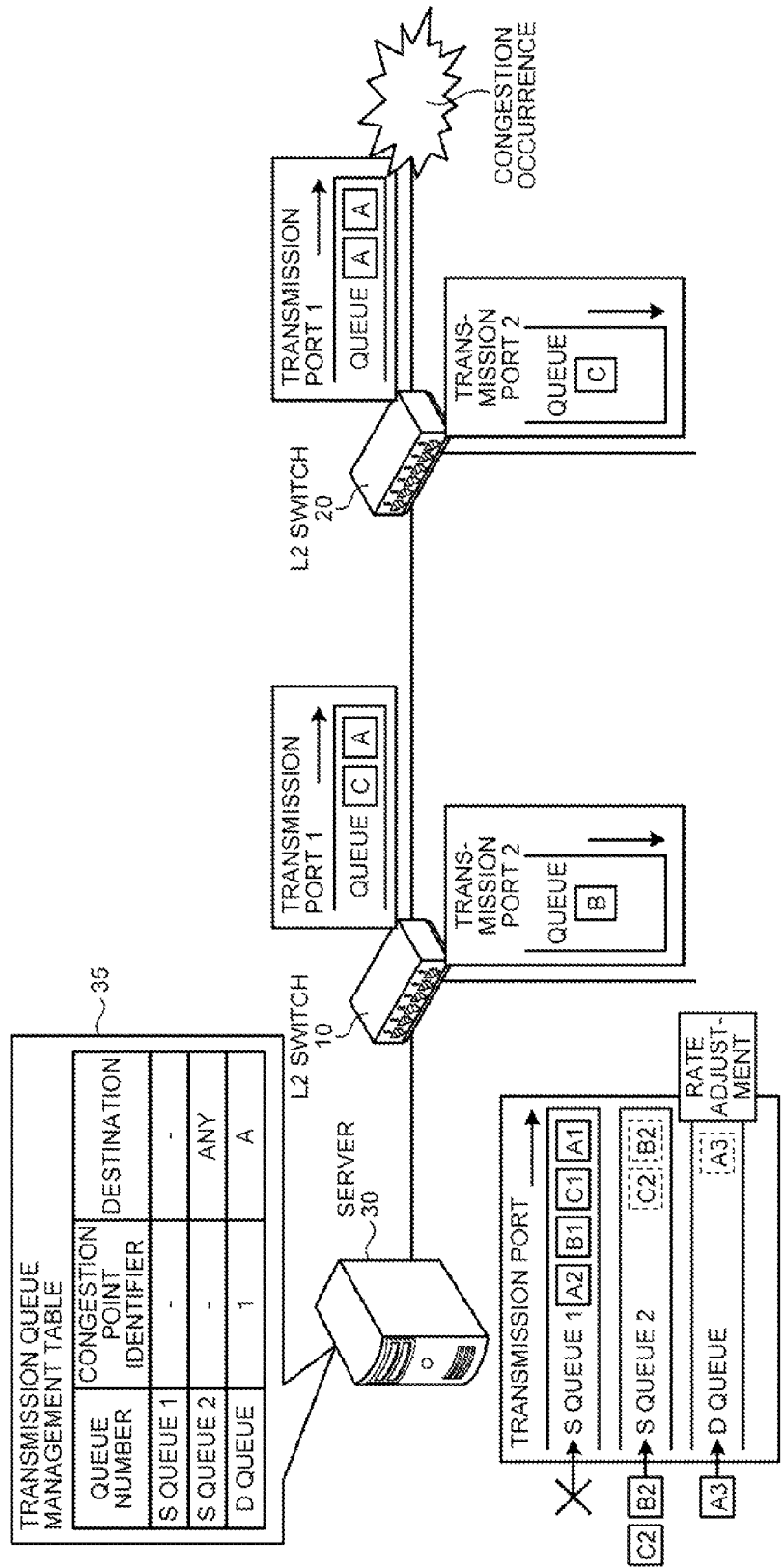
FIG. 13 is a schematic diagram illustrating an example of a state before congestion is relieved in a system according to a second embodiment.
Figure 14:
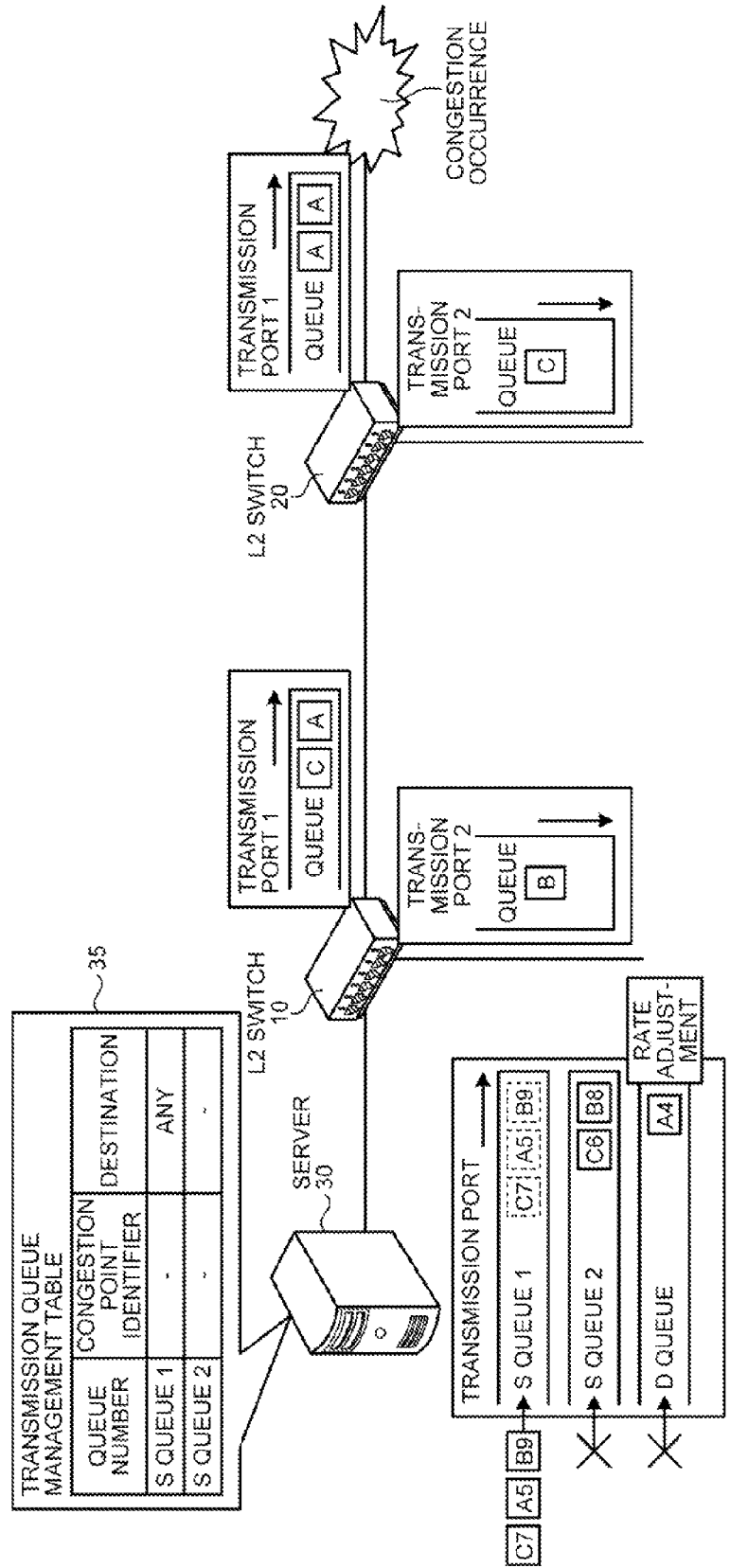
FIG. 14 is a schematic diagram illustrating an example of the control performed when congestion has been relieved in the system according to the second embodiment.

In the first embodiment, a process for detecting congestion has been described. In a second embodiment, a process performed when congestion is relieved will be described. FIG. 13 is a schematic diagram illustrating an example of a state before congestion is relieved in a system according to a second embodiment. FIG. 14 is a schematic diagram illustrating an example of the control performed when congestion has been relieved in the system according to the second embodiment. It is assumed that the configuration of a system according to the second embodiment is the same as that of the first embodiment.

At Time of Congestion Detection

As illustrated in FIG. 13, if the congestion detection unit 36b in the server 30 periodically receives, from the L2 switch 20, congestion control packets indicating the "congestion point identifier=1 and the Encapsulated DA=A", the congestion detection unit 36b detects congestion. Then, the congestion detection unit 36b creates, in the transmission queue management table 35, a record for the D queue indicating the "congestion point identifier=1 and the destination=A" and updates the transmission queue configuration table 34. Furthermore, the congestion detection unit 36b changes the S queues and creates a D queue in the queue area 33.

Then, the storing unit 36c stops storing data in the S queue 1. Furthermore, from among the data B2, C2, and A3, which are the data to be transmitted after congestion is detected, the storing unit 36c stores the data B2 and C2 in the S queue 2, which are data other than data for the destination A in which the congestion is detected. Furthermore, from among the data B2, C2, and A3 that are data to be transmitted after congestion is detected, the storing unit 36c stores, in the D queue, the data A3, which is data for the destination A in which the congestion is detected.

Subsequently, in the case illustrated in FIG. 13, after the data A2 that is stored at the end of the S queue 1 is transmitted, the second transmitting unit 36e reads the data B2 that is stored at the top of the S queue 2 and transmits it. Similarly, after the data A2 that is stored at the end of the S queue 1 is transmitted, the third transmitting unit 36f reads the data A3 that is stored at the top of the D queue and transmits it.

At time of Congestion Relief

In the following, a case will be described with reference to FIG. 14, in which congestion is relieved from when the congestion is controlled as illustrated in FIG. 13. As illustrated FIG. 14, if the congestion detection unit 36b does not receive, from the L2 switch 20 for a predetermined period of time, a congestion control packet containing the "congestion point identifier=1 and Encapsulated DA=A", the congestion detection unit 36b detects that the congestion has been relieved. For example, if congestion is detected, the congestion detection unit 36b periodically receives a congestion control packet. However, if the congestion detection unit 36b does not receive a congestion control packet for 15 ms after receiving the latest congestion control packet, the congestion detection unit 36b determines that the congestion has been relieved.

Then, the congestion detection unit 36b that detects relief of congestion deletes the record for the D queue, which is stored in the transmission queue management table 35, that contains "congestion point identifier=1 and destination=A". Furthermore, by changing the "destination" of the S queue 2 stored in the transmission queue management table 35 to "-" and changing the "destination" of the S queue 1 stored in the transmission queue management table 35 to "any", the congestion detection unit 36b changes the S queues back to their original state.

Specifically, until the congestion is relieved, from among the data B8, C6, and A4 that are data to be transmitted after congestion is detected, the storing unit 36c stores, in the S queue 2, the data B8 and C6 that are the data other than data for the destination A in which the congestion is detected. Then, the second transmitting unit 36e sequentially reads data from the S queue 2 and transmits them to the destination. Similarly, from among the data B8, C6, and A4 to be transmitted after the congestion is detected, the storing unit 36c stores, in the D queue, the data A4 for the destination A in which the congestion is detected. Then, the third transmitting unit 36f sequentially reads data from the D queue and transmits them to the destination.

Thereafter, if the congestion is relieved, the storing unit 36c stops storing data in the S queue 2 or the D queue. Then, the storing unit 36c sequentially stores the data B9, A5, and C7 that are to be transmitted after the congestion is relieved in the S queue 1. Then, after no data is stored in the S queue 2 and the D queue, the first transmitting unit 36d reads data from the S queue 1 and starts data transmission. Specifically, in the case illustrated in FIG. 14, after the data C6 stored in the S queue 2 and the data A4 stored in the D queue are transmitted, the first transmitting unit 36d sequentially reads the data stored in the S queue 1 from the data B9 that is stored at the top of S queue 1. Furthermore, if all of the data in the D queue are transmitted by the third transmitting unit 36f, the storing unit 36c deletes the D queue from the queue area 33.

As described above, according to the second embodiment, even if queues are changed when congestion is relieved in such a manner that the queues are used before the congestion, it is possible to prevent the order of the transmission from being inverted. Furthermore, because the D queue is deleted after the relief of congestion, it is possible to reduce the amount of memory used for the queues.

[c] Third Embodiment

Figure 15:
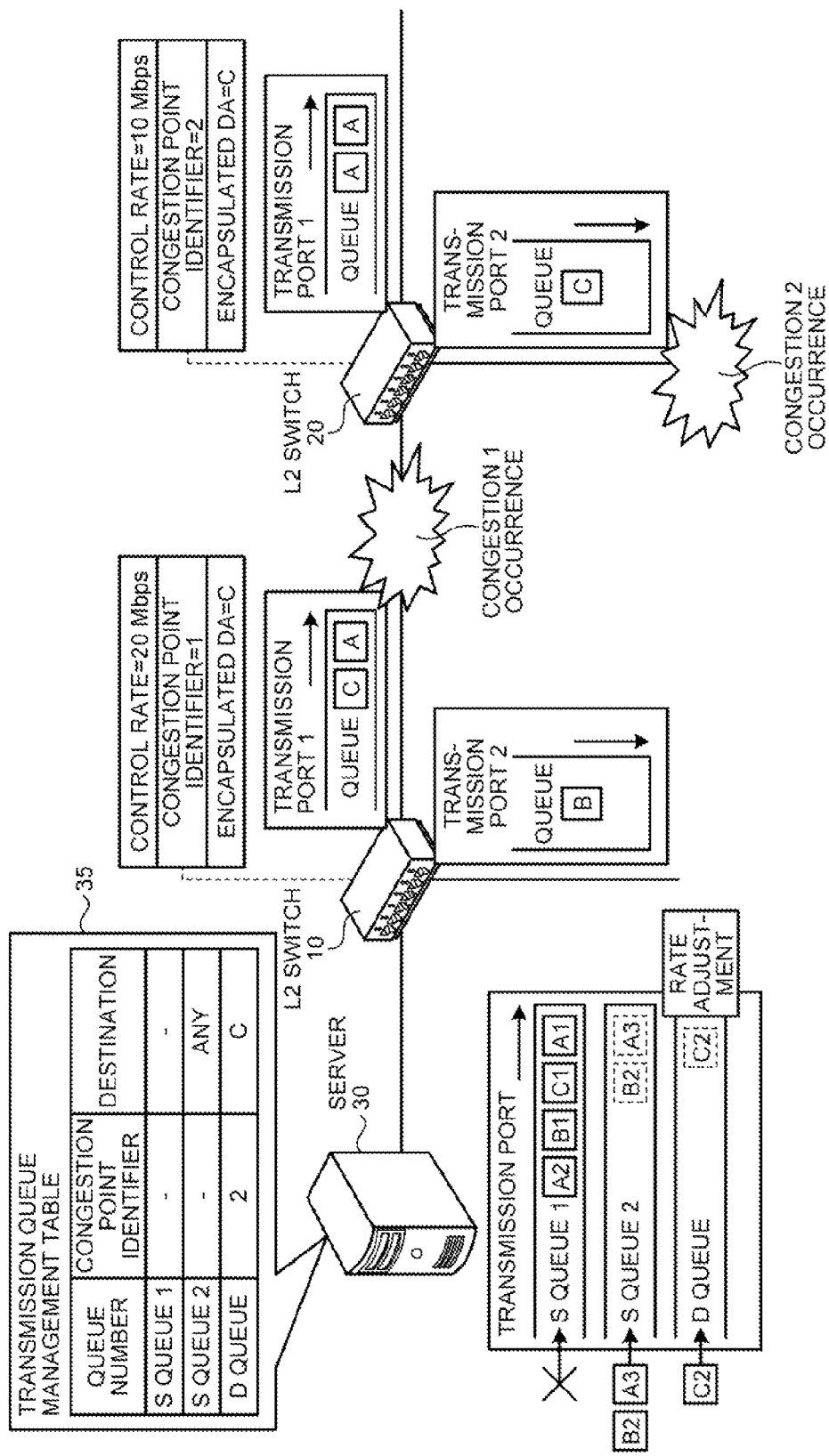
FIG. 15 is a schematic diagram illustrating a control example 1 performed when congestion is detected at several points in a system according to a third embodiment.
Figure 16:
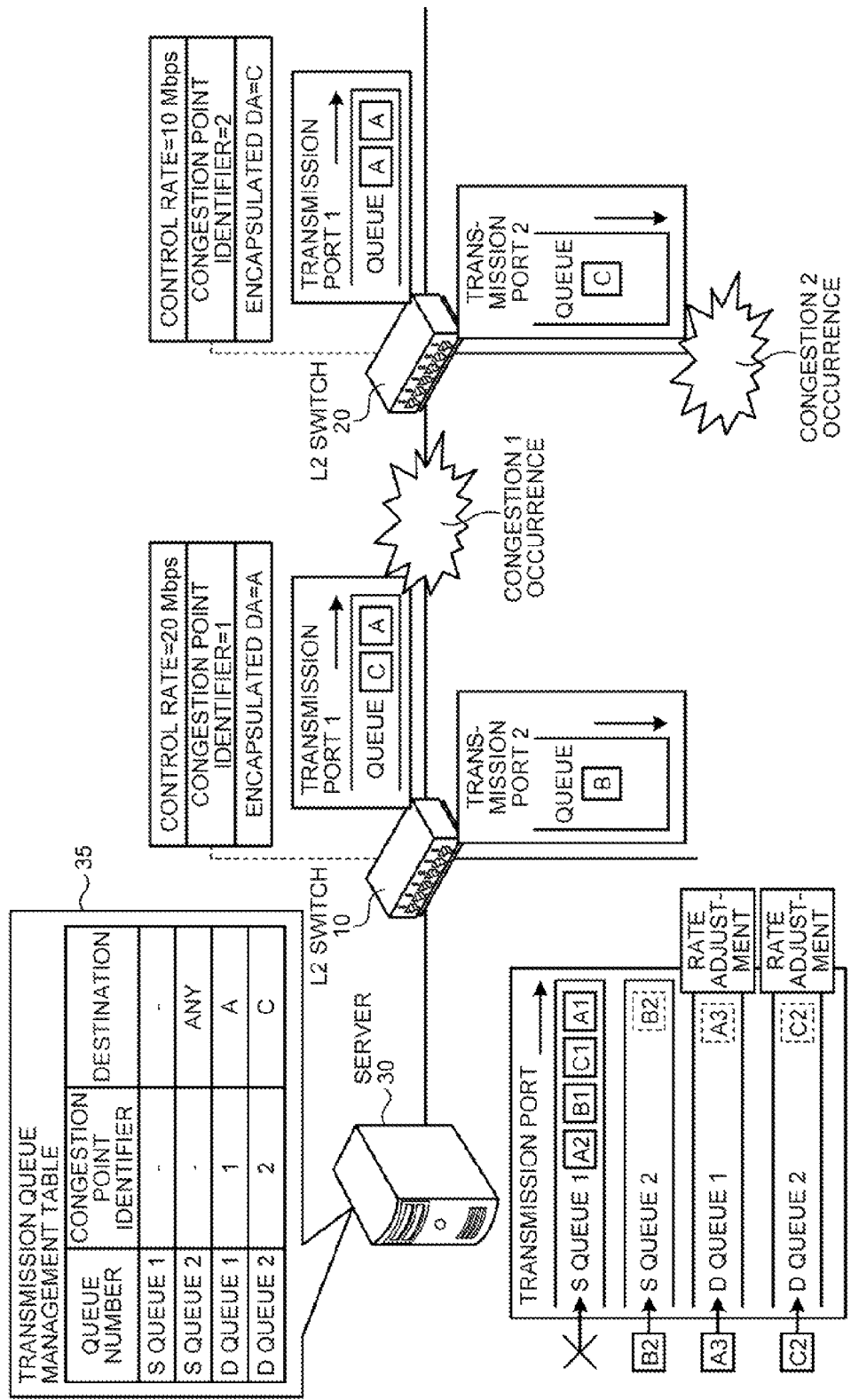
FIG. 16 is a schematic diagram illustrating a control example 2 performed when congestion is detected at several points in the system according to the third embodiment.

In the first embodiment, a description has been given of a process performed when congestion is detected at a single point. In a third embodiment, a description will be given of a process performed when congestion is detected at several points. FIG. 15 is a schematic diagram illustrating a control example 1 performed when congestion is detected at several points in a system according to a third embodiment. FIG. 16 is a schematic diagram illustrating a control example 2 performed when congestion is detected at several points in the system according to the third embodiment. It is assumed that the configuration of a system according to the third embodiment is the same as that of the first embodiment.

At Time of Congestion Detection at Several Points

Example 1

As illustrated in FIG. 15, the congestion detection unit 36b in the server 30 periodically receives, from the L2 switch 10, a congestion control packet containing the "control rate=20 Mbps, congestion point identifier=1, and Encapsulated DA=C". Subsequently, the congestion detection unit 36b periodically receives, from the L2 switch 20, a congestion control packet containing the "control rate=10 Mbps, congestion point identifier=2, and Encapsulated DA=C".

Then, the congestion detection unit 36b determines that the congestion that is detected this time has worsened because the control rate of the congestion control packet received from the L2 switch 10 is "20" and the control rate of the congestion control packet received from the L2 switch 20 is "10". Specifically, because the congestion point identifiers are different to each other but the address in which the congestion is detected is the same, the congestion detection unit 36b specifies the congestion control packet having smaller bandwidth as the target packet for the congestion control.

Thereafter, in a similar manner as in the first and second embodiments, the congestion detection unit 36b creates, in the transmission queue management table 35, a record for the D queue indicating the "congestion point identifier=2 and the destination=C" and also updates the transmission queue configuration table 34. Furthermore, by changing the "destination" of the S queue 1 in the transmission queue management table 35 to "-" and changing the "destination" of the S queue 2 to "any", the congestion detection unit 36b changes the S queues.

Then, from among the data B2, C2, and A3 to be transmitted after congestion is detected, the storing unit 36c stores, in the S queue 2, the data A3 and B2 that are the data other than data for the destination C in which congestion is detected. Furthermore, from among the data B2, C2, and A3 to be transmitted after congestion is detected, the storing unit 36c stores, in the D queue, the data C2 that is the data for the destination C in which congestion is detected.

In the case illustrated in FIG. 15, after the data A2 that is stored at the end of the S queue 1 is transmitted, the second transmitting unit 36e reads the data A3 stored at the top of the S queue 2 and transmits it. Similarly, after the data A2 that is stored at the end of the S queue 1 is transmitted, the third transmitting unit 36f reads the data C2 stored at the top of the D queue and transmits it.

At Time of Congestion Detection at Several Points

Example 2

As illustrated in FIG. 16, the congestion detection unit 36b in the server 30 periodically receives, from the L2 switch 10, the congestion control packet indicating the "control rate=20 Mbps, the congestion point identifier=1, and the Encapsulated DA=A". Subsequently, the congestion detection unit 36b periodically receives, from the L2 switch 20, the congestion control packet indicating the "control rate=10 Mbps, the congestion point identifier=2, and the Encapsulated DA=C".

Then, the congestion detection unit 36b creates a record for the D queue 1 in the transmission queue management table 35 indicating the "congestion point identifier=1 and the destination=A". Similarly, the congestion detection unit 36b creates a record for the D queue 1 in the transmission queue configuration table 34. Furthermore, the congestion detection unit 36b creates a record for the D queue 2 in the transmission queue management table 35 indicating the "congestion point identifier=2 and the destination=C". Similarly, the congestion detection unit 36b creates a record for the D queue 2 in the transmission queue configuration table 34.

Subsequently, by changing the "destination" of the S queue 1 in the transmission queue management table 35 to "-" and the "destination" of the S queue 2 to "any", the congestion detection unit 36b changes the S queues.

If congestion is detected, the storing unit 36c stops storing data in the S queue 1. Furthermore, from among the data B2, C2, and A3 to be transmitted after congestion is detected, the storing unit 36c stores, in the S queue 2, the data B2 that is data other than data for the destination A and C in which congestion is detected. Furthermore, from among the data B2, C2, and A3 to be transmitted after congestion is detected, the storing unit 36c stores, in the D queue 1, the data A3 for the destination A in which congestion is detected. Similarly, from among the data B2, C2, and A3 to be transmitted after congestion is detected, the storing unit 36c stores, in the D queue 2, the data C2 for the destination C in which congestion is detected.

Subsequently, after the completion of the transmission of the data stored in the S queue 1, the second transmitting unit 36e sequentially reads the data from the S queue 2 and transmits them to the destination. Similarly, after the completion of the transmission of the data stored in the S queue 1, the third transmitting unit 36f sequentially reads the data from the D queue 1, controls their bandwidth, and transmits them to the destination. Similarly, after the completion of the transmission of data stored in the S queue 1, the third transmitting unit 36f sequentially reads the data from the D queue 2, controls their bandwidth, and transmits them to the destination.

Specifically, in the case illustrated in FIG. 16, after the data A2 stored at the end of the S queue 1 is transmitted, the second transmitting unit 36e reads the data B2 stored at the top of the S queue 2 and transmits it. Similarly, after the data A2 stored at the end of the S queue 1, the third transmitting unit 36f reads the data A3 stored at the top of the D queue 1 and transmits it. Similarly, after the data A2 that is stored at the end of the S queue 1, the third transmitting unit 36f reads the data C2 that is stored at the top of the D queue 2 and transmits it.

Advantage of Third Embodiment

As described above, according to the third embodiment, it is possible to control the bandwidth of the transmission data for the destination where it may worsen congestion; therefore, congestion can be promptly relieved. Furthermore, according to the third embodiment, even when several congestions are detected, it is possible to control, for each queue, data that affect congestion. Accordingly, it is possible to reduce the effect applied to each congestion and thus each congestion can be promptly relieved. Furthermore, even when several congestions are detected, it is possible to control, for each queue, the transmission of data that affects each congestion. This makes it possible to prevent the order of the transmission from being inverted.

[d] Fourth Embodiment

In the above explanation, a description has been given of the embodiments according to the present invention; however, the embodiments are not limited thereto and can be implemented with various kinds of embodiments other than the embodiments described above. Therefore, another embodiment will be described below.

Congestion Detection Method

In the embodiments described above, the case has been described as an example in which congestion is detected using a congestion control method prescribed by IEEE 802.1Qau; however, the present invention is not limited thereto. For example, congestion can also be detected, for example, by monitoring the activity of the network, by using a trap using a simple network management protocol (SNMP), or by using monitoring software.

Control of D Queue

In the embodiments described above, a case has been described, as an example, in which a destination to be stored in a single D queue is one; however the present invention is not limited thereto. For example, if congestion sequentially occurs in different destinations at the same port of the L2 switch, i.e., if congestion sequentially occurs in different destinations having the same congestion point identifier, it is possible to store two destinations in the same queue.

Application to L2 switch

In the embodiments described above, the case has been described as an example in which the server 30 controls congestion; however the present invention is not limited thereto. For example, it is also possible to apply the above cases to a communication device, such as the L2 switch. When applying it to the L2 switch, the processes described above are performed for each port.

System

Furthermore, of the processes described in the embodiments, the whole or a part of the processes that are mentioned as being automatically performed can be manually performed or the whole or a part of the processes that are mentioned as being manually performed can be automatically performed using known methods. Furthermore, the process procedures, the control procedures, the specific names, and the information containing various kinds of data or parameters indicated in the above specification and drawings, for example, in FIGS. 4 and 6 to 9, can be arbitrarily changed unless otherwise stated. The data to be transmitted by the server disclosed in the present invention can also be data received from another device or be data created by an application executed by an operating system.

The components of each unit illustrated in the drawings are only for conceptually illustrating the functions thereof and are not necessarily physically configured as illustrated in the drawings. Specifically, the specific shape of a separate or integrated device is not limited to the drawings; for example, the storing unit 36c can be divided into a first storing unit, a second storing unit, and a third storing unit. In other words, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Program

The various processes described in the first embodiment can be implemented by a program prepared in advance and executed by a computer system such as a personal computer or a workstation. Accordingly, in the following, a computer system that executes the program having the same function as that described in the above embodiments will be described as an example.

Figure 17:
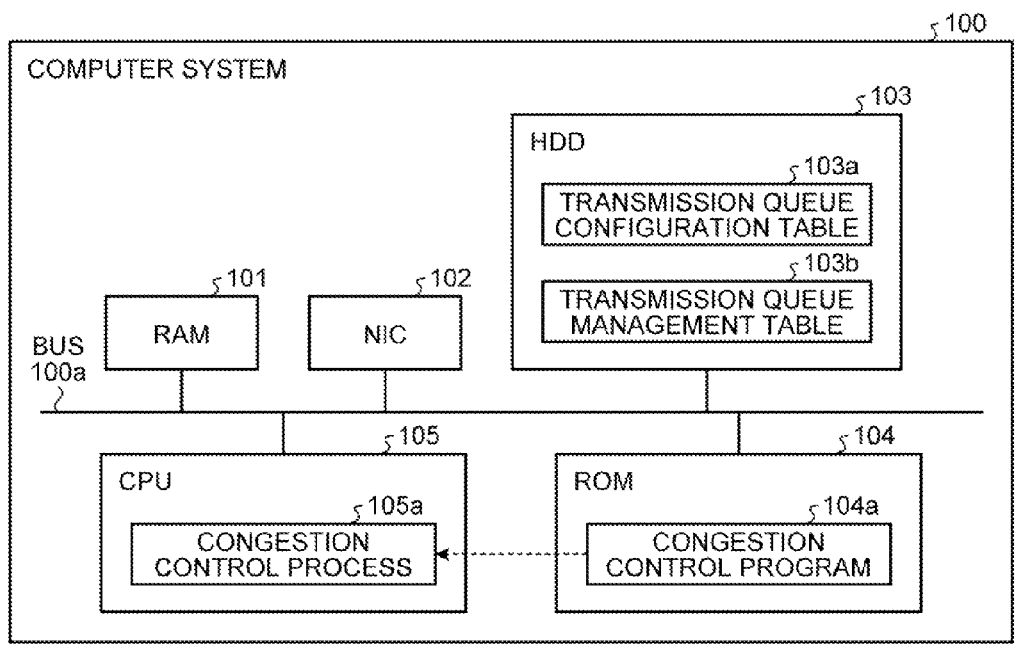
FIG. 17 is a block diagram illustrating an example of a computer system that executes a congestion control program.
Figure 18:
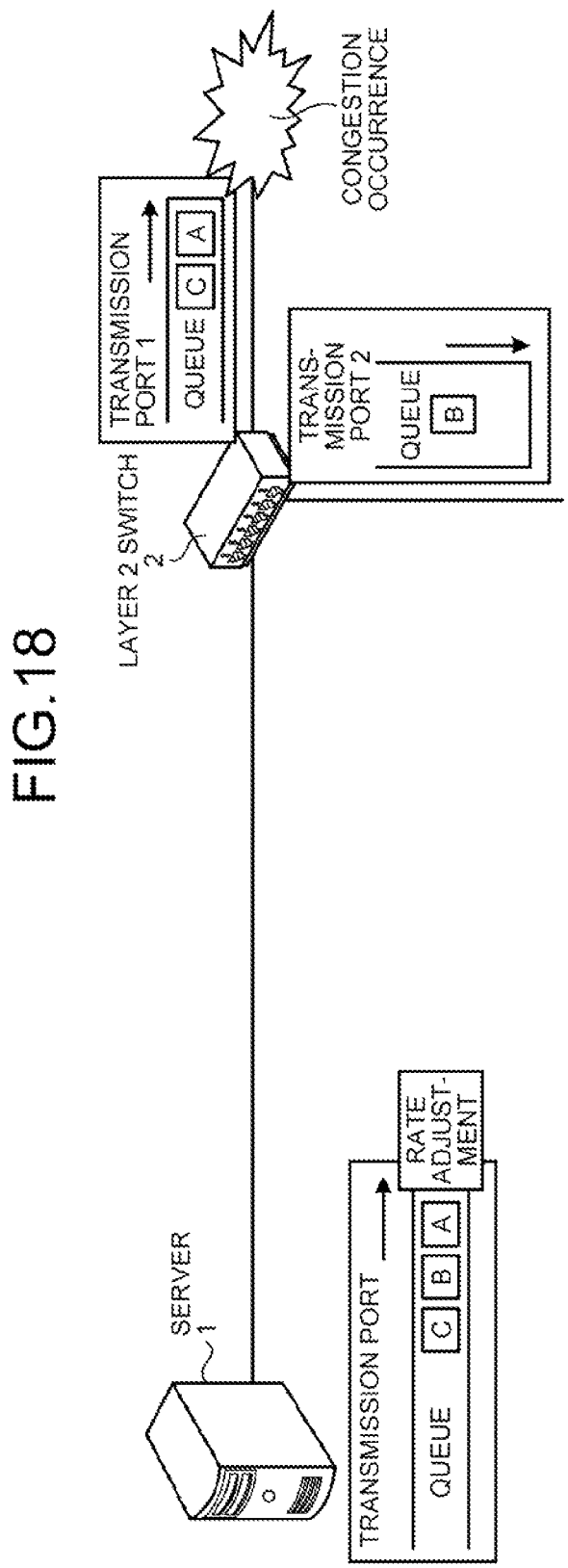
FIG. 18 is a schematic diagram illustrating an example of a server that transmits data using a single queue.
Figure 19:
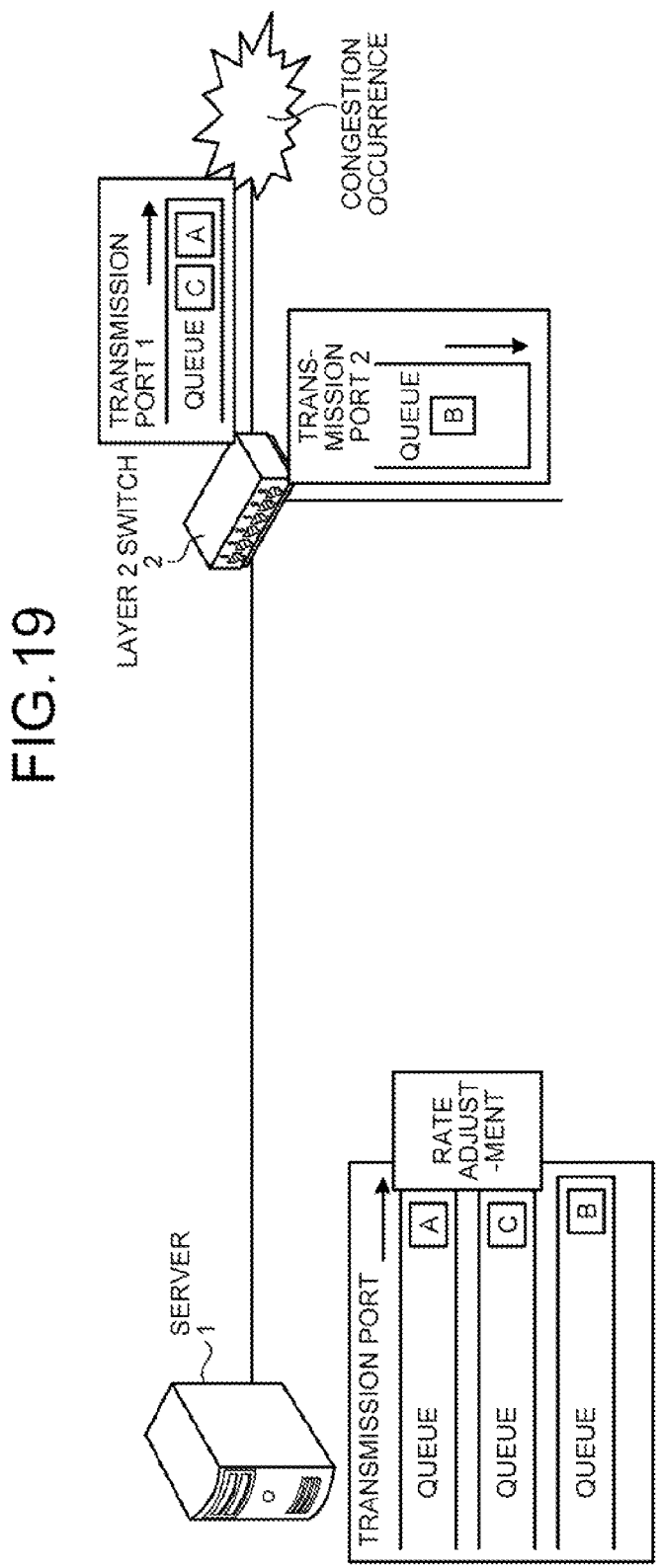
FIG. 19 is a schematic diagram illustrating an example of a server that transmits data by producing queues for each destination address.

FIG. 17 is a block diagram illustrating an example of a computer system that executes a congestion control program. As illustrated in FIG. 17, a computer system 100 includes a CPU 105, a read only memory (ROM) 104, and a random access memory (RAM) 101, which are all connected to a bus 100a. Furthermore, the computer system 100 also includes a network interface card (NIC) 102, and a hard disk drive (HDD) 103, which are all connected to the bus 100a.

In the HDD 103, a transmission queue configuration table 103a corresponding to the transmission queue configuration table 34 illustrated in FIG. 5 is arranged. Similarly, in the HDD 103, a transmission queue management table 103b corresponding to the transmission queue management table 35 is arranged.

The ROM 104 stores therein a congestion control program 104a. The ROM 104 is mentioned as an example of a recording medium; however, the present invention is not limited thereto. For example, various programs can also be stored in another computer readable recording medium, such as an HDD, a RAM, or a CD-ROM and can also be read by a computer. Furthermore, programs can also be obtained and used by arranging a storage medium at a remote site and by a computer accessing the storage medium. Furthermore, the obtained programs can also be stored in the recording medium in the computer.

By reading and executing the congestion control program 104a, the CPU 105 operates a congestion control process 105a that executes each function described in, for example, FIG. 5. Specifically, the congestion control process 105a executes the same functions as the receive control unit 36a, the congestion detection unit 36b, the storing unit 36c, the first transmitting unit 36d, the second transmitting unit 36e, the third transmitting unit 36f. In this way, the computer system 100 reads the program from the ROM 104 and executes it, and the computer system 100 thereby operates as an information processing apparatus in which the congestion control process 105a is executed.

According to the present invention, data can be efficiently transmitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing therein a congestion control program causing a computer to execute a process, the process comprising:
    storing data in a first queue among the first queue and a third queue which is held in the computer before a congestion is detected;
    transmitting the data stored in the first queue;
    creating a second queue and changing a queue to be controlled from the first queue to the third queue when the congestion is detected by a relay device that receives the data and relays the data to a destination;
    storing the first data for a destination for which the congestion is detected in the second queue from among data to be transmitted after the congestion is detected;
    storing second data, other than the first data from among the data to be transmitted after the congestion is detected, in the third queue;
    performing reading and transmitting the second data stored in the third queue and reading and transmitting the first data stored in the second queue using a narrower bandwidth than a bandwidth which is used at the transmitting of the data and the second data in parallel after the data stored in the first queue are transmitted and the first queue is empty.

2. The computer-readable, non-transitory medium according to claim 1, the process further comprising:
    storing, when the congestion is relieved, data to be transmitted after the congestion is relieved in the first queue; and
    reading and transmitting, after the data stored in the second queue and the third queue are transmitted, the data stored in the first queue.

3. The computer-readable, non-transitory medium according to claim 1, wherein the storing of the first data in the second queue further includes deleting the created second queue when the congestion is relieved.

4. The computer-readable, non-transitory medium according to claim 1, the process further comprising:
    specifying, when a plurality of congestions is detected, a congestion that is a target for a band control on the basis of bandwidths for the congestions, wherein
    the storing of the first data in the second queue includes storing data for a destination for which the specified congestion is detected in the second queue from among data to be transmitted after the congestions are detected, and
    the storing of the second data in the third queue includes storing data other than the data for the destination for which the specified congestion is detected in the third queue from among the data to be transmitted after the congestions are detected.

5. A computer-readable, non-transitory medium storing therein a congestion control program causing a computer to execute a process comprising:
storing data in a first queue among the first queue and a second queue which is held in the computer before a congestion is detected;
transmitting the data stored in the first queue;
creating a third queue and a fourth queue and changing a queue to be controlled from the first queue to the second queue when a first congestion and a second congestion are detected by a relay device that receives the data and relays the data to a destination;
storing, first data other than second and third data for destinations for which the first congestion and the second congestion are detected in the second queue from among data to be transmitted after the first congestion and the second congestion are detected;
storing the second data for a destination for which the first congestion is detected in the third queue from among the data to be transmitted after the first congestion and the second congestion are detected;
storing the third data for a destination for which the second congestion is detected in the fourth queue from among the data to be transmitted after the first congestion and the second congestion are detected;
performing reading and transmitting the first data stored in the second queue and reading and transmitting the second data stored in the third queue and the third data stored in the fourth queue using a narrower bandwidth than a bandwidth which is used at the transmitting of the data and the first data in parallel after the data stored in the first queue are transmitted and the first queue is empty.

6. An information processing apparatus comprising;
a storing unit that includes a first queue for storing data to be transmitted, a second queue for storing, which is created when a congestion is detected by a relay device that receives the data and relays the data to a destination, first data for a destination for which the congestion is detected from among data to be transmitted after the congestion is detected, and a third queue for storing second data other than the first data from among data to be transmitted after the congestion is detected; and
a transmitting unit that transmits the data before the congestion is detected, changes a queue to be controlled from the first queue to the third queue when the congestion is detected, and performs transmitting the second data stored in the third queue and transmitting the first data stored in the second queue using a narrower bandwidth than a bandwidth which is used at the transmitting of the data and the second data in parallel after the data stored in the first queue are transmitted and the first queue is empty.

7. The information processing apparatus according to claim 6, wherein
the storing unit stores, when the congestion is relieved, data to be transmitted after the congestion is relieved in the first queue, and
the transmitting unit reads and transmits, after the data stored in the second queue and in the third queue are transmitted, the data stored in the first queue.

8. The information processing apparatus according to claim 6, wherein the storing unit deletes the second queue when the congestion is relieved.

9. The information processing apparatus according to claim 6, further comprising a specifying unit that specifies, when a plurality of congestions is detected, a congestion that is a target for a band control on the basis of bandwidths for the congestions, wherein
the storing unit stores data for a destination for which the congestion specified by the specifying unit is detected in the second queue from among data to be transmitted after the congestions are detected,
the storing unit stores data other than the data for the destination for which the congestion specified by the specifying unit is detected in the third queue from among the data to be transmitted after the congestions are detected, and
the transmitting unit reads and transmits, after all the data stored in the first queue are transmitted, the data stored in the second queue and the data stored in the third queue while controlling the narrow bandwidth of the data stored in the second queue.

10. An information processing apparatus comprising:
a storing unit that includes a first queue for storing data to be transmitted, a second queue for storing, when a first congestion and a second congestion are detected by a relay device that receives the data and relays the data to a destination, first data other than second and third data for destinations for which the first congestion and the second congestion are detected from among data to be transmitted after the first congestion and the second congestion are detected, a third queue for storing, which is created when the first congestion and the second congestion are detected, the second data for the destination for which the first congestion is detected from among the data to be transmitted after the first congestion and the second congestion are detected, and a fourth queue for storing, which is created when the first congestion and the second congestion are detected, the third data for the destination for which the second congestion is detected from among the data to be transmitted after the first congestion and the second congestion are detected; and
a transmitting unit that transmits the data stored in the first queue, changes a queue to be controlled from the first queue to the second queue when the first congestion and the second congestion are detected, and performs transmitting the first data stored in the second queue transmitting the second data stored in the third queue and the third data stored in the fourth queue using a narrower bandwidth than a bandwidth which is used at the transmitting of the data and the first data in parallel after the data stored in the first queue are transmitted and the first queue is empty.

11. An information processing apparatus comprising:
a processor; and a memory coupled to the processor, wherein the processor executes: storing data in a first queue among the first queue and a third queue which is held in a computer before a congestion is detected;
transmitting the data stored in the first queue;
creating a second queue and changing a queue to be controlled from the first queue to the third queue when the congestion is detected by a relay device that receives the data and relays the data to a destination;
storing first data for a destination for which the congestion is detected in the second queue from among data to be transmitted after the congestion is detected;
storing second data other than the first data in the third queue from among the data to be transmitted after the congestion is detected;

performing reading and transmitting the second data stored in the third queue and reading and transmitting the first data stored in the second queue using a narrower bandwidth than a bandwidth which is used at the transmitting of the data and the second data in parallel after the data stored in the first queue are transmitted and the first queue is empty.

12. A congestion control method comprising:

storing data in a first queue among the first queue and a third queue which is held in a computer before a congestion is detected;

transmitting the data stored in the first queue;

creating a second queue and changing a queue to be controlled from the first queue to the third queue when the congestion is detected by a relay device that receives the data and relays the data to a destination;

storing first data for a destination for which the congestion is detected in the second queue from among data to be transmitted after the congestion is detected when the congestion is detected;

storing second data other than the first data in the third queue from among the data to be transmitted after the congestion is detected; and performing reading and transmitting the second data stored in the third queue;

and reading and transmitting the first data stored in the second queue using a narrower bandwidth than a bandwidth which is used at the transmitting of the data and the second data in parallel after the data stored in the first queue are transmitted and the first queue is empty.

* * * * *